US011418239B2

(12) United States Patent
Vijayan et al.

(10) Patent No.: US 11,418,239 B2
(45) Date of Patent: Aug. 16, 2022

(54) DECODING UPLINK IN A MASSIVE MULTIPLE INPUT MULTIPLE OUTPUT WIRELESS COMMUNICATION SYSTEM FOR AN OPEN RADIO ACCESS NETWORK

(71) Applicant: MAVENIR SYSTEMS, INC., Richardson, TX (US)

(72) Inventors: Logeshwaran Vijayan, Bengaluru (IN); Karthik Muralidhar, Bengaluru (IN)

(73) Assignee: Mavenir Systems, Inc., Richardson, TX (US)

( * ) Notice: Subject to any disclaimer, the term of this patent is extended or adjusted under 35 U.S.C. 154(b) by 0 days.

(21) Appl. No.: 17/213,490

(22) Filed: Mar. 26, 2021

(65) Prior Publication Data
US 2021/0306039 A1    Sep. 30, 2021

(30) Foreign Application Priority Data
Mar. 27, 2020   (IN) .............................. 202021013446

(51) Int. Cl.
*H04B 7/0456* (2017.01)
*H04L 25/02* (2006.01)
(Continued)

(52) U.S. Cl.
CPC ............. *H04B 7/0456* (2013.01); *G06N 5/04* (2013.01); *G06N 20/00* (2019.01); *H04L 5/0048* (2013.01); *H04L 25/0224* (2013.01)

(58) Field of Classification Search
CPC ... H04W 88/085; G06N 20/00; H04B 7/0456; H04L 25/03993; H04L 25/0204; H04L 25/0224
See application file for complete search history.

(56) References Cited

U.S. PATENT DOCUMENTS

2007/0072551 A1*   3/2007   Pajukoski ............ H04B 7/0857
                                                       455/501
2014/0160949 A1*   6/2014   Clausen ................ H04L 5/0073
                                                       370/252
(Continued)

FOREIGN PATENT DOCUMENTS

WO        2020242352 A1    12/2020

OTHER PUBLICATIONS

Potter et al., "MIMO Beam-Forming with Neural Network Channel Prediction Trained by a Novel PSO-EA-DEPSO Algorithm el PSO-EA-DEPSO Algorithm", Missouri University of Science and Technology, Jun. 2008 (Year: 2008).*
(Continued)

*Primary Examiner* — Aristocratis Fotakis
(74) *Attorney, Agent, or Firm* — Ruggiero, McAllister & McMahon LLC

(57) ABSTRACT

There is provided a technique of decoding an uplink in a multiple input multiple output wireless communication system in an open radio access network having an open distributed unit (O-DU) and an open radio unit (O-RU). The O-DU (a) constructs a combining matrix for a resource block, and (b) sends the combining matrix to the O-RU. The O-RU (a) utilizes the combining matrix to compress signals on $N_R$ antennas per subcarrier into M values, where $N_R$ is a number of antennas, and M is less than $N_R$, and (b) sends the M values per subcarrier to the O-DU.

19 Claims, 17 Drawing Sheets

(51) Int. Cl.
     H04L 5/00      (2006.01)
     G06N 20/00     (2019.01)
     G06N 5/04      (2006.01)

(56)            References Cited

U.S. PATENT DOCUMENTS

| 2015/0372728 | A1* | 12/2015 | Rahman ............... H04B 7/0456 |
|---|---|---|---|
| | | | 370/329 |
| 2018/0013597 | A1* | 1/2018 | Barbieri ................. H04L 27/26 |
| 2018/0287673 | A1* | 10/2018 | Chang ................ H04L 25/0224 |
| 2019/0289497 | A1 | 9/2019 | Rajagopal |
| 2020/0127717 | A1* | 4/2020 | Osterling ............ H03M 7/3068 |
| 2021/0143931 | A1* | 5/2021 | Sandberg .............. H04L 1/0009 |

OTHER PUBLICATIONS

"O-RAN Alliance Working Group 4, Management Plane Specification" ORAN-WG4 MP.0-v05.00, O-RAN Alliance 2021.
"O-RAN Fronthaul Working Group, Control, User and Synchronization Plane Specification" ORAN-WG4 CUS.0-V05.00, O-Ran Alliance 2021.
Checko et al"Cloud RAN for Mobile Networks—A Technology Overview" IEEE Communications Surveys & Tutorials, vol. 17, No. 1 pp. 405-426, Jan. 1, 2015.
Extended European Search report for corresponding European application EP21165205.2, 9 pages, dated Sep. 13, 2021.

* cited by examiner

Desired cell, intra cell and inter cell with users

Simplified diagram to illustrate O-DU and O-RU processing in Uplink

SRS subband scheduling timeline and weight computation based on SRS

SRS fullband scheduling timeline and weight computation based on SRS

SRS symbols used in linear prediction

1st part of combining matrix based on SRS and 2nd part based on DMRS

Timeline of Operation: 1st part based on SRS and 2nd part based on DMRS

Timeline of Operation for Buffering up PUSCH data symbols and applying MMSE-IRC

DECODING UPLINK IN A MASSIVE MULTIPLE INPUT MULTIPLE OUTPUT WIRELESS COMMUNICATION SYSTEM FOR AN OPEN RADIO ACCESS NETWORK

CROSS-REFERENCE TO RELATED APPLICATIONS

The present application is claiming priority of Indian Provisional Patent Application Ser. No. 202021013446, filed on Mar. 27, 2020, the content of which is herein incorporated by reference.

BACKGROUND OF THE DISCLOSURE

1. Field of the Disclosure

The present application relates to uplink in a radio access network, and discloses a technique that is particularly well-suited for a massive single/multi-user multiple input multiple output (UL MU MIMO) decoding in an open radio access network (O-RAN) based Split 7.2 wireless communication system. The decoding is an efficient and optimal decoding in the context of an open radio unit (O-RU) and an open distributed unit (O-DU) that are part of the O-RAN system.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

O-RAN Fronthaul Working Group—Control, User and Synchronization Plane Specification. ORAN-WG4.CUS.0-v01.02, provides background information about O-RAN operations.

In a Split 7.2 O-RAN system, processing in L1 (defined below) is split across an O-RU and an O-DU that communicate via a fronthaul. In order to reduce the number of information symbols sent over the fronthaul, signals received in the O-RU are compressed by a combining matrix that is sent from the O-DU to the O-RU. This compression, and the fact that the combining matrix gets old, i.e., channel aging due to user equipment (UE) speeds, will affect the performance. The present disclosure is about improving the performance.

SUMMARY OF THE DISCLOSURE

In the present disclosure, there is provided a technique of decoding an uplink in a multiple input multiple output wireless communication system in an open radio access network having an open distributed unit (O-DU) and an open radio unit (O-RU). The O-DU (a) constructs a combining matrix for a resource block, and (b) sends the combining matrix to the O-RU. The O-RU (a) utilizes the combining matrix to compress signals on $N_R$ antennas per subcarrier into M values, where $N_R$ is a number of antennas, and M is less than $N_R$, and (b) sends the M values per subcarrier to the O-DU.

BRIEF DESCRIPTION OF THE DRAWINGS

A component or a feature that is common to more than one drawing is indicated with the same reference number in each of the drawings.

DESCRIPTION OF THE DISCLOSURE

Figure 1:
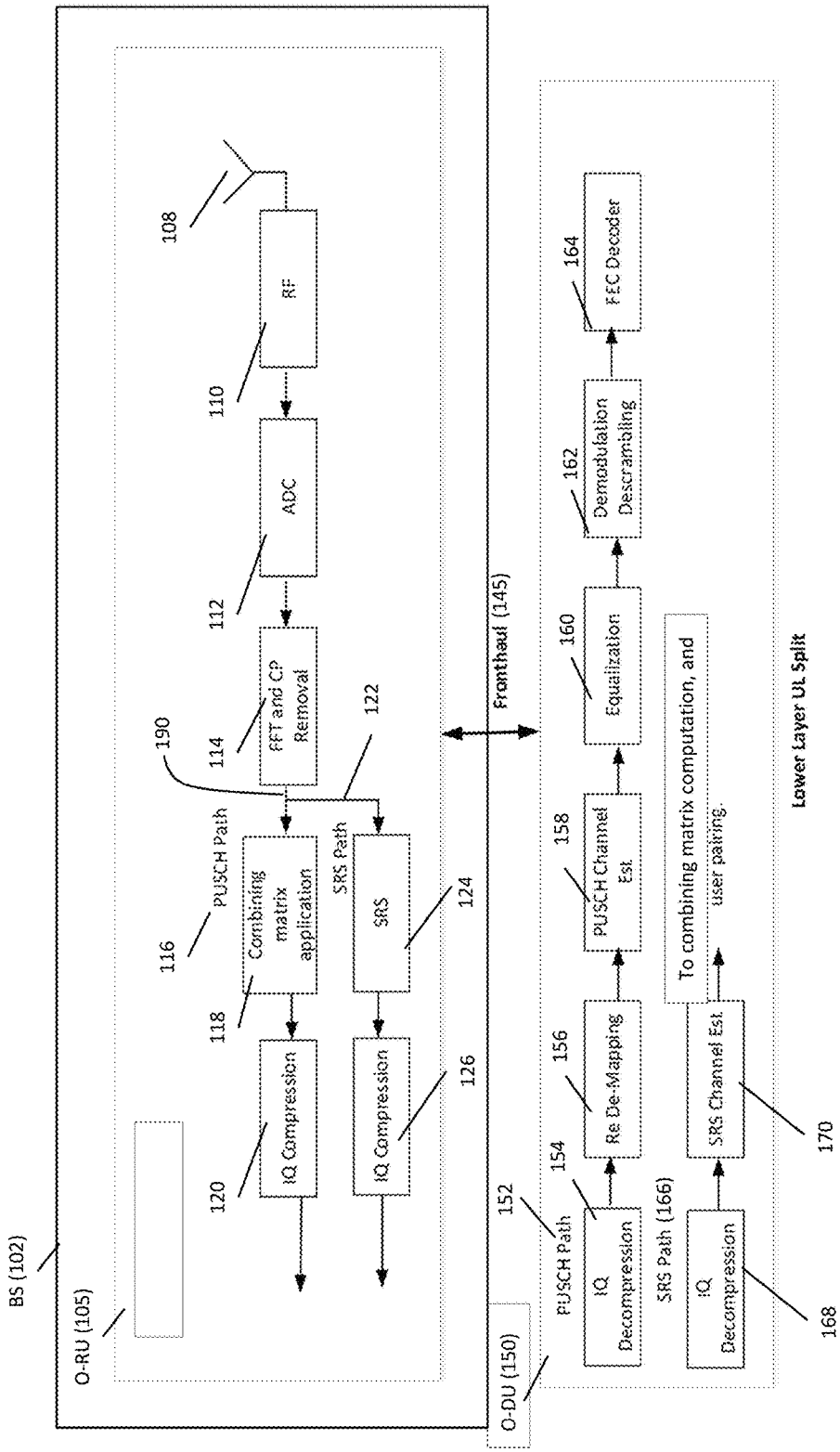
FIG. 1 is a block diagram of functionality split for uplink in an O-RAN.

The following is a list of acronyms that are used herein.
3GPP 3rd Generation Partnership Project
5G NR TDD 5G New Radio Time-Division Duplex.
AWGN Additive White Gaussian Noise
ADC Analog to Digital Converter
BS Base Station
CE Channel Estimation
CP Cyclic Prefix
CSF Current Subframe
CSI Channel State Information
DL Downlink
DMRS Demodulation Reference Signals
DU Distributed Unit
eNB eNodeB
FEC Forward Error Correction
FFT Fast Fourier Transform
FH Fronthaul
GSMA Global System for Mobile Communications Association
IFFT Inverse Fast Fourier Transform
IQ In-phase/Quadrature-phase
IRC Interference Rejection Combining
LTE Long-Term Evolution
LP Linear Prediction
MAC Medium Access Layer
MIMO Multiple Input Multiple Output
mMIMO Massive MIMO MMSE Minimum Mean Squared Error
MU-MIMO Multi-User MIMO
NG-RAN Next Generation Radio Access Network
OFDM Orthogonal Frequency Division Multiplexing
O-DU Open Distributed Unit
O-RAN Open Radio Access Network
O-RU Open Radio Unit
PUSCH Physical Uplink Shared Channel
RAN Radio Access Network
RB Resource Block
RF Radio Frequency
SF Subframe
SFN System Frame Number
SRS Sounding Reference Signals
SSF Special Subframe
TDD Time division duplex
UE User Equipment
UL Uplink Before proceeding further, we present some matrix notation used in the present document.

Let $$A = \begin{bmatrix} 1 & 2 & 9 & 10 \\ 3 & 4 & 11 & 12 \\ 5 & 6 & 13 & 14 \\ 7 & 8 & 15 & 16 \end{bmatrix} \text{ and } a = [3 \ 1]$$

then:
A(2,1) is the element in the second row and first column, i.e.,3;
A(:,3) is the third column of A;
A(2,:) is the second row of A;

$$A(a,:) = \begin{bmatrix} 5 & 6 & 13 & 14 \\ 1 & 2 & 9 & 10 \end{bmatrix}$$

that is the third and first rows of A in that order; and $$A(:,a) = \begin{bmatrix} 9 & 1 \\ 11 & 3 \\ 13 & 5 \\ 15 & 7 \end{bmatrix}$$

that is the third and first columns in that order.

We define a conjugate transpose operation on a matrix as doing a transpose and applying a conjugate on all elements of the matrix. For example, if $$A = \begin{bmatrix} b & e \\ c & f \\ d & g \end{bmatrix},$$

then the conjugate transpose is defined as $$A^H = \begin{bmatrix} conj(b) & conj(c) & conj(d) \\ conj(e) & conj(f) & cong(g) \end{bmatrix}.$$

For two matrices of same dimensions A and B, A.*B denotes a new matrix arrived at by doing element-wise multiplication of elements of A and B and has same dimensions as A and B.

B* is the matrix of same dimensions as B but with each element the conjugate of the corresponding element in B.

$$\sum_{columns} A = \begin{bmatrix} 22 \\ 30 \\ 38 \\ 46 \end{bmatrix}$$

is a column vector that is the sum of columns of A.

An Open Radio Access Network (O-RAN) is totally disaggregated approach to deploying mobile fronthaul and midhaul networks, built entirely on cloud native principles. O-RAN is an evolution of the Next Generation RAN (NG-RAN) architecture, first introduced by the GSMA's 3GPP in their release 15 (5G version 1) technical specification TS 38.401. The O-RAN Alliance formed to undertake the advancement of NG-RAN philosphies, expanding on the scope of what was originally outlined by the 3GPP. The O-RAN alliance issues specifications and releases open source software under the auspices of the Linux Foundation.

An Open Distributed Unit (O-DU) is that part of the L1 in an O-RAN system typically implemented in software and contains frequency domain processing (after FFT). In any wireless communication system, there are different layers (i.e., software modules such as L1, L2, etc.). L1 is referred to as physical layer. L2 is referred to as a MAC layer. The physical layer has time domain and frequency domain operations. Time-domain to frequency domain is possible because of FFT/IFFT. The demarcation boundary of FFT/IFFT splits the physical layer into lower PHY or O-RU and upper PHY or O-DU.

An Open Radio Unit (O-RU) is that part of the L1 in an O-RAN system that performs time domain operations on the received signal (before FFT/IFFT).

An uplink is a radio link between a UE and a BS, in the direction from the UE to the BS.

A downlink is a radio link between a BS and a UE, in the direction from the BS to the UE.

A combining matrix is a matrix having a number of rows much less than its number of columns, e.g., 8 rows and 64 columns. When a column vector is multiplied by a combining matrix, the result is a much smaller column vector. For example, a column vector having 64 elements, multiplied by an 8×64 combining matrix, results in a column vector having 8 elements.

Consider a combining matrix of dimension M×$N_R$, where $N_R$ is the number of antennas, i.e., a quantity of antennas, in an O-RU (see FIG. 1., antennas 108). $N_R$ values received by the $N_R$ antennas per subcarrier are converted to an $N_R$×1 vector and in the O-RU, are multiplied by the combining matrix to yield a column vector having M values that are then sent from the O-RU to the O-DU. The combining matrix is the same for all subcarriers in an RB. The M values that are sent to the O-DU are per subcarrier. Typically, $N_R$=64, M=8. As an example, if there are 64 antennas in a BS, O-RU 105 receives 64 values after module 114, per subcarrier. However, only 8 values might be sent from the O-RU to the O-DU. This is achieved by using an 8×64 combining matrix and multiplying it by the 64×1 values received per subcarrier across the antennas. Although we say received by antenna, we are actually referring to the values after FFT and CP removal (see FIG. 1, module 114) across all antennas. It is common in literature to say received by antennas.

A resource block is a set of 12 subcarriers.

A subcarrier is a basic unit in frequency domain over which information symbols are transmitted.

"Channel" means the medium of air where signals are sent. In the literature, they also use "channel" for various signals sent by UE, such as PUSCH, SRS, etc. The "CH" in "PUSCH" stands for "channel".

A sounding reference signal (SRS) is a channel that is sent by a UE to a BS, and used by the BS to learn the uplink channel, i.e., air medium. Sounding reference signals are transmitted on the uplink and allow the network to estimate the quality of the channel, i.e., air medium, at different frequencies.

A channel estimate is an estimate of a channel value, i.e., air medium, determined at a receiver. For example, module 158 estimates a channel using received PUSCH and module 170 estimates a channel using the received SRS.

A physical uplink shared channel (PUSCH) is a channel that is used to convey information via information symbols between a UE and a BS. In LTE for example, one SF of PUSCH in an uplink has 2 slots, and each slot has 7 OFDM symbols, of which 6 OFDM symbols convey information, i.e., data, and the middle OFDM symbol is a DMRS, where a known symbol, also called as pilot symbol, is transmitted. The pilot symbol helps in learning the channel, i.e., air medium, also called a channel estimate. The channel so learned will be used to decipher the information symbols sent over data symbols. Note each symbol has many resource blocks in the frequency domain. Each resource block comprises 12 subcarriers spanning over a slot. PUSCH symbols mean PUSCH OFDM data symbols and PUSCH OFDM DMRS (or pilot) symbols.

A demodulation reference signal (DMRS) is an OFDM symbol whose subcarriers carry known values. This is used for channel estimation.

The present document discloses methods for efficient decoding of uplink single-user/multi-user MIMO in an O-RAN for massive MIMO. The decoding is split across an Open Distributed Unit (O-DU) and an Open Radio Unit (O-RU). The O-DU (a) constructs a combining matrix for a resource block, and (b) sends the combining matrix to the O-RU. The O-RU (a) utilizes the combining matrix to compress signals on $N_R$ antennas per subcarrier into M values, where $N_R$ is a number of antennas, and M is less than $N_R$, and (b) sends the M values per subcarrier to the O-DU. All combining matrices are per resource block (RB) (12 subcarriers) processing both at O-DU and O-RU, unless otherwise mentioned.

A first method disclosed herein consists of splitting the minimum mean squared error (MMSE) combining matrix into two parts. The first part is derived from channel estimates obtained using SRS symbols over all antennas that are transferred from an O-RU to an O-DU, and the O-DU sending the first part of a combining matrix back to the O-RU for application on PUSCH symbols. The first part can be further improved by applying prediction techniques, such as Kalman filtering/linear prediction, to the channel estimates to overcome channel aging, which is inherent in SRS. For the second part, the O-RU transfers compressed DMRS by applying a combining matrix on it, or all DMRS received on all antennas without any combining matrix application, to the O-DU, which computes and applies the second part of the combining matrix on the PUSCH data symbols.

A second method disclosed herein, which gives optimal performance in the presence of inter-cell interference, involves an O-RU buffering of PUSCH symbols in an uplink subframe (SF), and transferring a DMRS symbol to an O-DU that computes a minimum mean squared error—interference rejection combining (MMSE-IRC) combining matrix in two parts, and sends the first part to the O-RU for reducing the dimensionality of the PUSCH symbols to layers, from antennas, so that fronthaul bandwidth is conserved. The second part is computed and applied on the received PUSCH symbols in the O-DU.

A third method disclosed herein involves building parts of a combining matrix in one or more ways, and depends on using eigen decomposition of a noise covariance matrix of intra-cell interferers, and null space of the intra-cell interferers, and using channel estimates of desired and intra-cell users (called as combining matrix methods). The combining matrix methods are based on SRS. However, ideally, the combining matrix methods would be based on a DMRS of a current subframe. An O-DU does not have access to the DMRS at a point of determination of the combining matrix, and hence uses the SRS, which is quite old in time. There is a loss of performance because of using an old value in the SRS. This is called channel aging. However, the O-DU can use linear prediction and/or Kalman filtering to predict the value it would take in the DMRS in the current subframe, based on the values in the past SRS. This third method uses LP/Kalman filtering.

FIG. 1 is a block diagram of a system 100 having a lower layer split in uplink in O-RAN 7.2, and shows the functionality split for UL. System 100 includes an O-RU 105 and an O-DU 150 that communicate with one another via a fronthaul 145. O-RU 105 and O-DU 150 together form a physical layer. O-RU 105 can be called a lower layer, and O-DU 150 can be called a higher layer of the physical layer. O-RU 105 is a part of a BS 102.

O-RU 105 converts radio signals from an antenna, to a digital signal that can be transmitted over fronthaul 145 to O-DU 150. In this regard, O-RU 105 includes an RF module 110 that receives a signal via one or more antennas, one of which is designated as antenna 108, performs an analog-to-digital conversion in ADC 112, and performs CP removal and FFT in module 114. The output of module 114 is designated as point 190. O-RU 105 has a PUSCH path 116 and an SRS path 122. In PUSCH path 116, O-RU 105 performs a combining matrix application (module 118) with a combining matrix received from O-DU 150. In SRS path 122, O-RU 105 transfers the FFT of the sounding reference signals (SRS) over all the antennas to O-DU 150 for channel estimation. Modules 110, 112, 122 and 114 are repeated for each antenna.

O-DU 150 has a PUSCH path 152 and an SRS path 166. In PUSCH path 152, O-DU 150 includes IQ decompression (module 154), Re de-mapping (module 156), PUSCH channel estimation (module 158), equalization (module 160), demodulation descrambling (module 162), and FEC decoder (module 164). In SRS path 166, O-DU 150 includes IQ decompression (module 168) and SRS channel estimate (also referred to as SRS CE) (module 170).

In O-RU 105, the SRS and PUSCH symbols are compressed using IQ compression (modules 120 and 126) to reduce the fronthaul 145 bandwidth, and in O-DU 150, decompression (modules 154 and 168) decompress the IQs.

O-RU 105 and O-DU 150 can reside in different physical locations, and fronthaul 145 is medium that connects them, and over which information transfer occurs. To minimize cost, system 100 sends as little information as possible over fronthaul 145, and for this reason system 100 employs a combining matrix in O-RU 105, which, as in the example above, converts 64 values per subcarrier received at the output of module 114 to 8 values for transmission over fronthaul 145. Generally, we can say the values are received at the antennas too, as it is understood that it is at the output of module 114.

Figure 2:
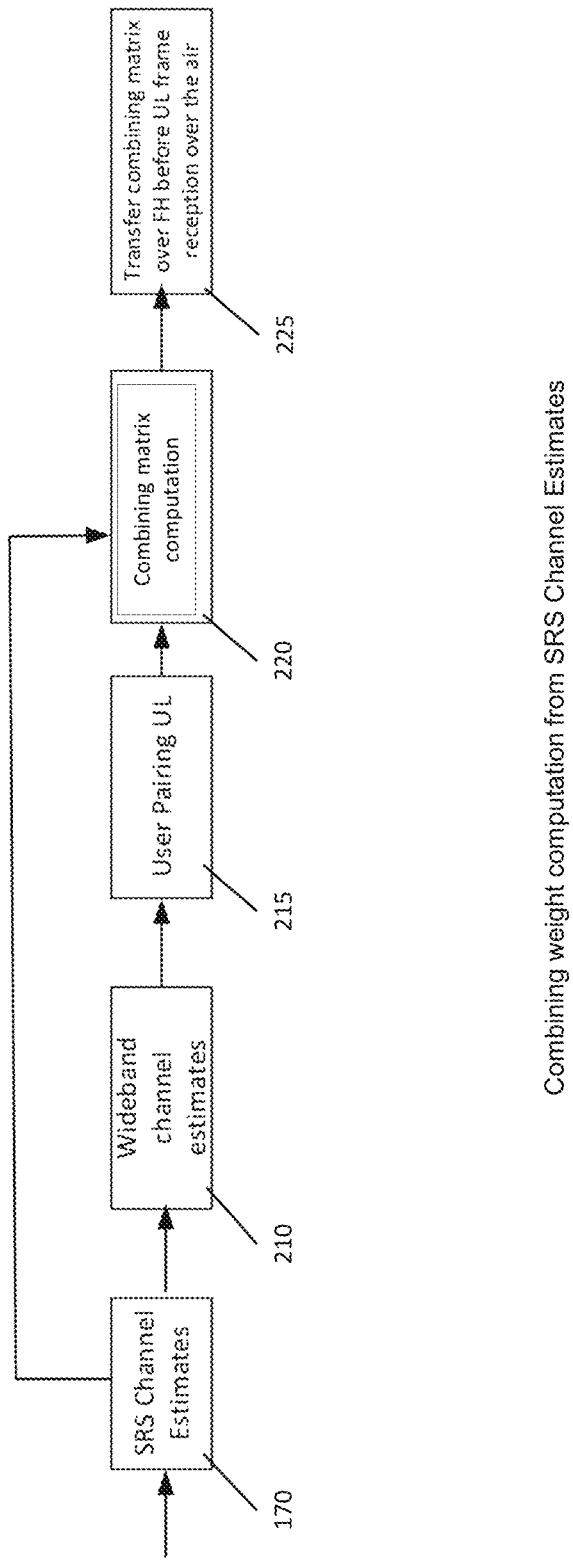
FIG. 2 is a block diagram of operations involved in combining weight or matrix computation in a distributed unit, and transfer to a radio unit.

FIG. 2 is a block diagram of operations involved in a combining matrix computation in O-DU 150, and transfer to O-RU 105.

In SRS CE module 170, which is introduced in FIG. 1, O-DU 150 computes the channel estimates for the scheduled users using the SRS signals received.

In module 210, channel estimates are processed to obtain wideband channel estimates.

In module 215, user pairing is implemented, typically in layer L2, i.e., the MAC layer, which takes the wideband channel estimates of the users, and pairs users to be scheduled for multi-user MIMO reception in uplink over scheduled RBs.

In module 220, the per RB channel estimates of the paired users are then used by layer L1 in O-DU 150 to compute the per RB combining matrix.

In module 225, the combining matrix is then transferred to O-RU 105 over fronthaul 145 just before a UL frame is received over the air.

Figure 3:
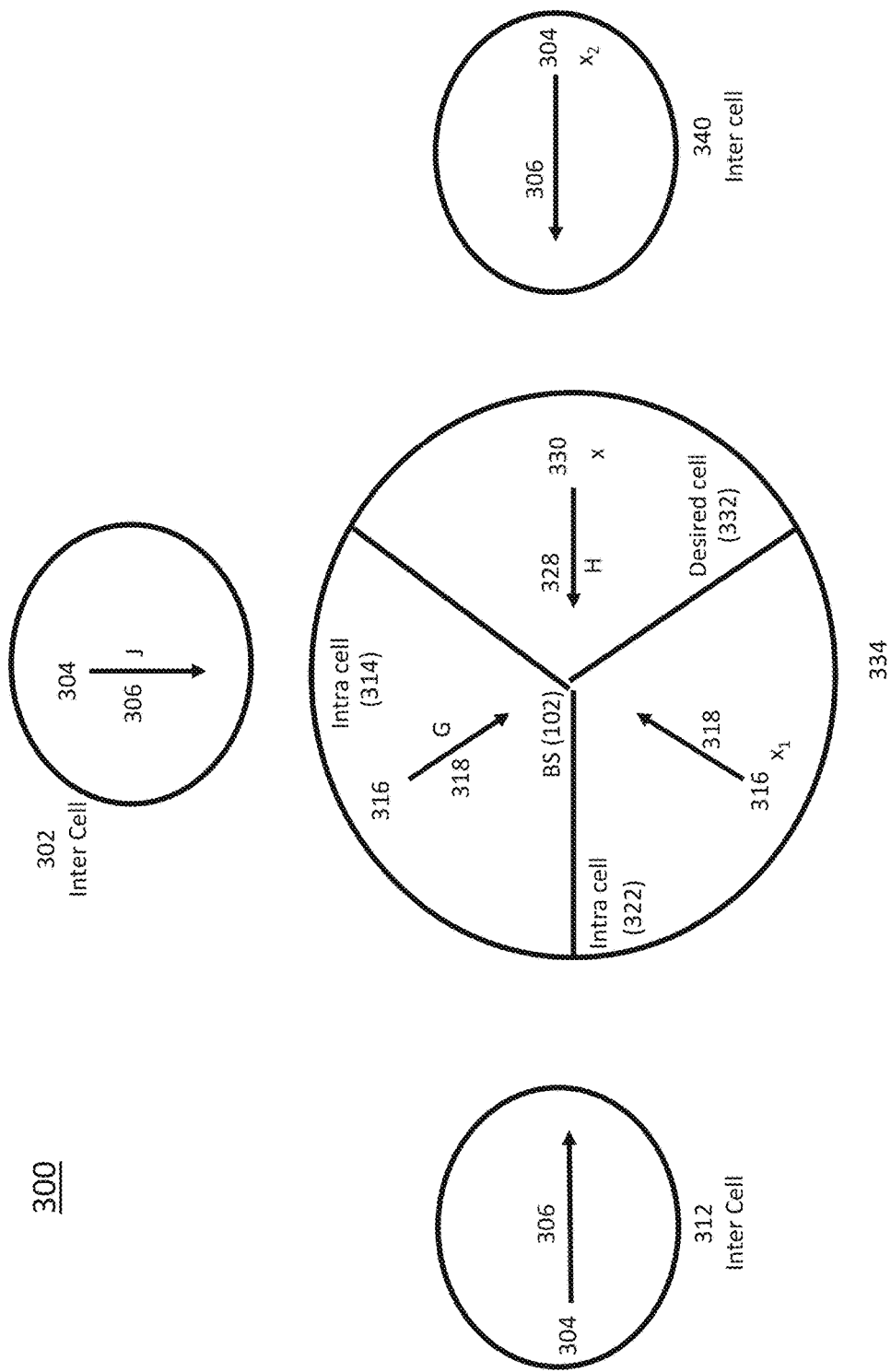
FIG. 3 is a diagram of desired cell, intra-cells and inter-cells with users.

FIG. 3 is a diagram of desired cell, intra-cells and inter-cells with users, and in this regard, shows a set of physical sites 300. There is a physical site 334, and neighboring physical sites 302, 312 and 340. Each physical site 302, 312, 334 and 340 and has three cells/sectors. For example, physical site 334 has sectors/cells 314, 322 and 332. BS 102 is at the center of physical site 334.

Let sector/cell 332 be a desired cell. BS 102 receives signals from users 330 (x) in desired cell 332 via channels H 328 (represented by a channel matrix H), and signals from users 316 (represented by $x_1$, and called intra-cell users/interferers) belonging to other cells 314/322 of the same physical site 334 as desired cell 332. Signals from users 316 (represented by $x_1$) are received at BS 102 via channels G 318. BS 102 also receives signals from users 304 ($x_2$) in neighboring physical sites 302, 312 and 340. These signals arrive at BS 102 via channels J 306. Users 304 are called inter-cell users/interferers.

Figure 4:
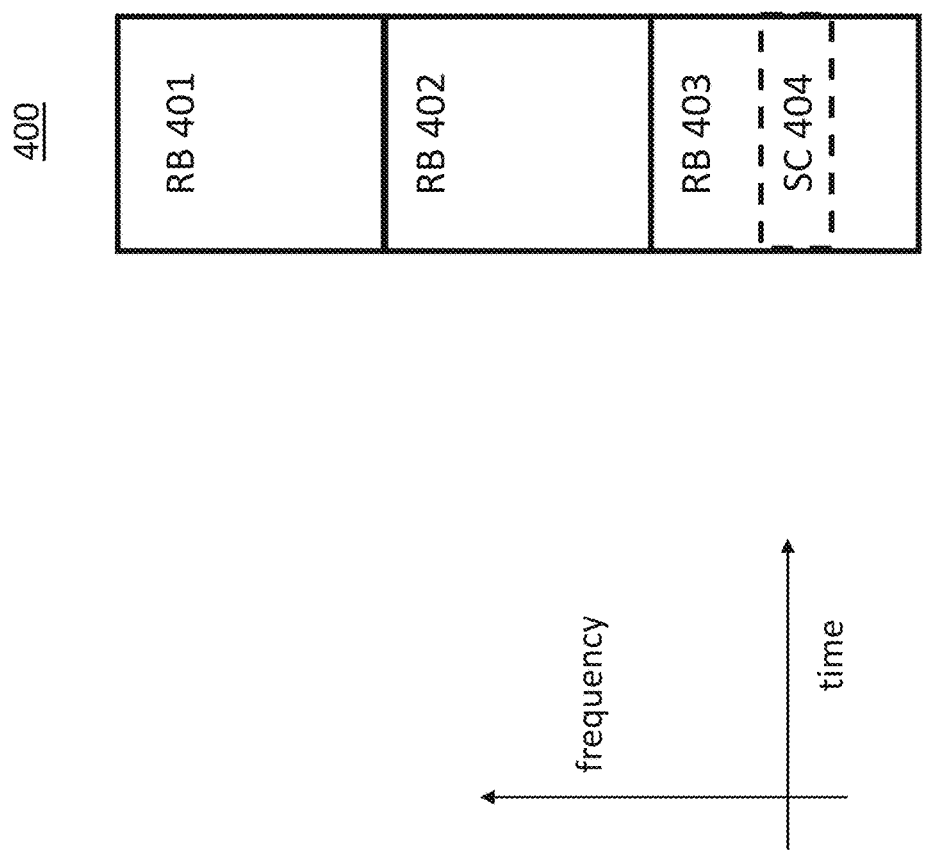
FIG. 4 is a diagram of a frequency domain signal that includes resource blocks and subcarriers.

FIG. 4 is a diagram of a frequency domain signal 400 received at BS 102. Frequency domain signal 400 consists of many resource blocks (RB) 401, 402 and 403. In FIG. 4, RB 401 is in a first frequency range, RB 402 is in a second frequency range, and RB 403 is in a third frequency range. Each RB has 12 subcarriers (SCs), e.g., RB 403 has SCs 404. The processing described in the present document is on a per-RB basis. Though popular convention is that an RB is over 7 OFDM symbols in the time domain and 12 SCs in the frequency domain, we denote the same RB as spanning over many SFs in time for simplicity. In that context, we refer to an RB as a range in frequency domain across time over many SFs. Thus, an RB spans both time and frequency.

Figure 5:
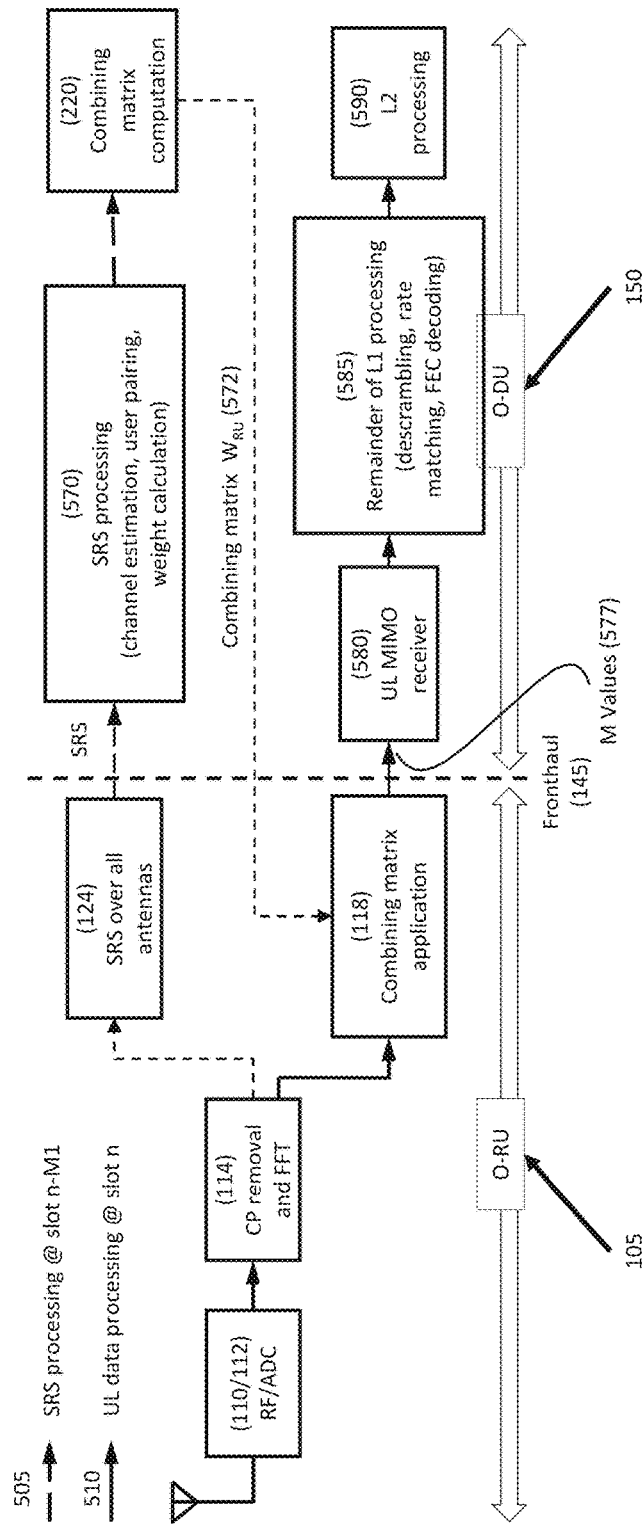
FIG. 5 is a block diagram of a task split between an O-RU and an O-DU for multi-user multiple input multiple output in an O-RAN.

FIG. 5 is a block diagram of a task 500, split between O-RU 105 and O-DU 150 for MU MIMO in O-RAN. Task 500 includes operations of RF/ADC in module 110/112, CP removal and FFT in module 114, SRS over all antennas in module 124, SRS processing in module 570 (which includes SRS CE module 170), combining matrix computation in module 220, combining matrix application in module 118, UL MIMO receiver in module 580, remainder of L1 processing in module 585 (which includes descrambling 162 and FEC decoder 164), and L2 processing 590.

There are two sets of processing/flows, namely processing/flow 505 and processing/flow 510. Processing/flow 505 is shown by dashed lines, and processing/flow 510 is shown by a solid line.

Figure 6:
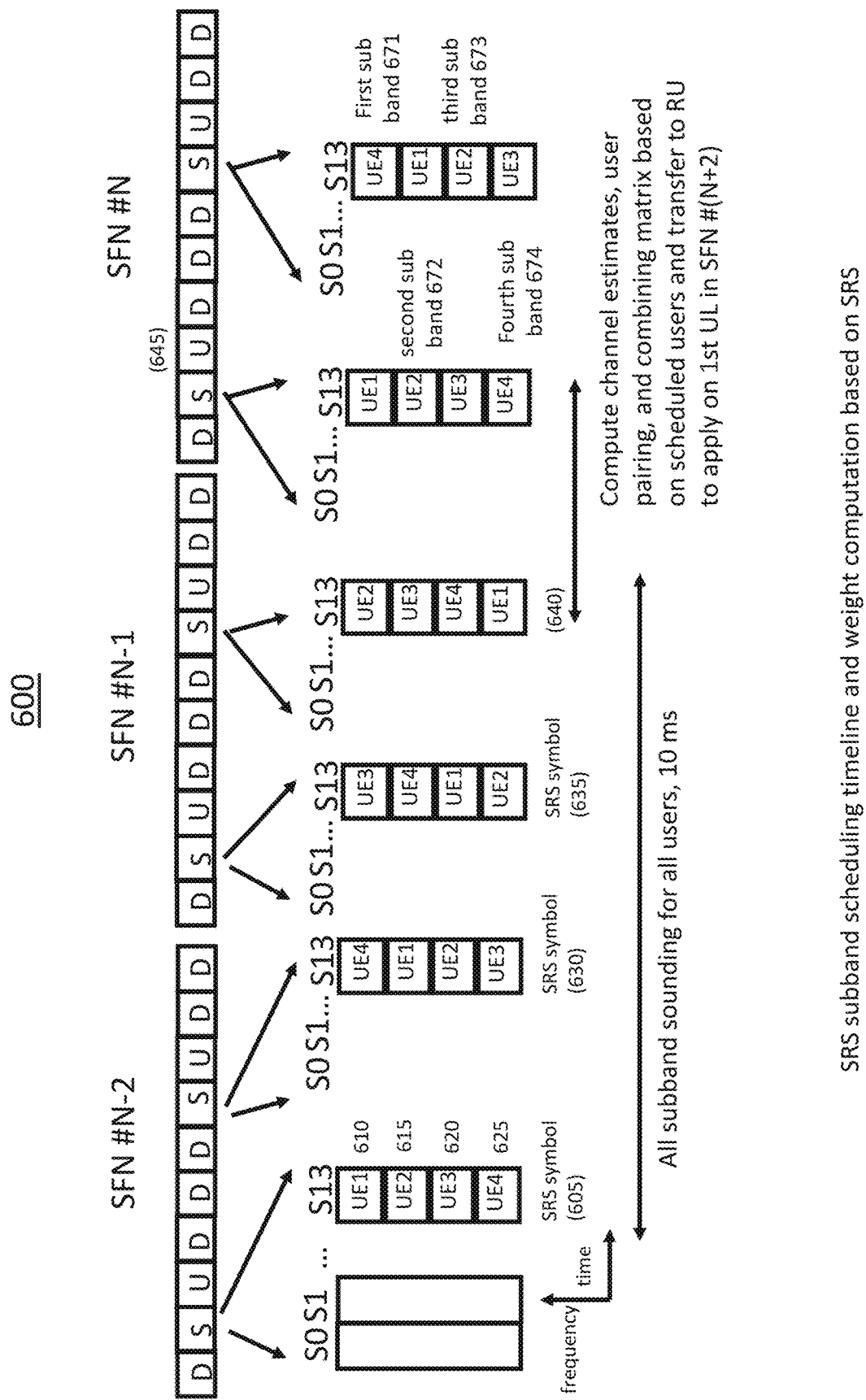
FIG. 6 is a diagram of sounding reference signals (SRS) subband scheduling for a group of users that form a multi-user MIMO pool.

Let the current SF (CSF) be n. The current SF is the SF in question where system 100 receives it over air, and decodes the PUSCH OFDM data symbols. This description is with respect to CSF. In FIG. 6 it is at 645 and in FIG. 7 it is at 745.

Processing/flow 505 is for SRS. Processing/flow 505 occurs M1 SFs before the CSF, and is a prior preparation for the reception of CSF (PUSCH). Processing/flow 505 involves transferring frequency domain SRS symbols across all antennas from O-RU 105 to O-DU 150. O-DU 150 processes these SRS symbols, computes channel estimates of H 328 (see FIG. 3) of all desired users 330, channel estimates of G 318 of all intra-cell users 316, and performs other processing in SRS processing 570 to arrive at a combining matrix $W_{RU}$ 572, which is sent from O-DU 150 to O-RU 105 before CSF. H is associated with all desired users and G is associated with all intra-cell users. System 100 needs to estimate the values of H and G, so the estimate is computed.

Processing/flow 510 shows processing for CSF, and PUSCH of CSF. O-RU 105 applies combining matrix $W_{RU}$ 572 on the PUSCH, and sends M values 577 to O-DU 150 for further processing. O-DU 150 then estimates desired users 330 of PUSCH. Alternatively, O-RU 105 can just apply combining matrix $W_{RU}$ 572 only on data symbols of the SF (s0 to s13, excluding DMRS 0 and DMRS 1 in FIG. 9) and transfers DMRS across all antennas to O-DU 150.

FIG. 6 is a diagram of SRS subband scheduling in an example 600, for a group of users that forms a multi-user MIMO pool. In LTE a frame consists of 10 subframes or SFs. LTE is chosen as an example, it could be 5G as well. SFN is the system frame number, which identifies the frame.

A subframe SF can be either a D (downlink), or a U (uplink), or an S (special subframe SSF that carries/contains SRS). The SSF or special subframe has 14 OFDM symbols, denoted by S0, . . . S13. In example 600, the last OFDM symbol in a special subframe (SSF) is used as SRS symbol 605, 630, 635, 640 and so on.

Four groups of users UE1 610, UE2 615, UE3 620 and UE4 625 are scheduled. Frequency is represented vertically, and time is represented horizontally. The entire frequency band is divided, as an example, into four subbands, as there are four UE groups.

In SRS symbol 605, UE1 group of users 610 is scheduled in the first subband 671, UE2 group of users 615 is scheduled in the second subband 672, UE3 group of users 620 is scheduled in the third subband 673, and UE4 group of users 625 is scheduled in the fourth subband 674.

Similarly, in SRS symbol 630, the UE groups are shifted to adjacent subbands, i.e., UE1 group of users 610 is scheduled in the second subband 672, UE2 group of users 615 is scheduled in the third subband 673, UE3 group of users 620 is scheduled in the fourth subband 674, and UE4 group of users 625 is scheduled in the first subband 671. So, the user groups are hopped across subbands with each new SRS symbol.

Based on SRS symbols 605, 630, 635 and 640, channel estimates of users in all groups are calculated for all subbands. Based on these channel estimates, a user is scheduled in an uplink SF 645 at SFN N.

As can be seen, depending on the SRS scheduling, the channel estimate for some sub-bands can be older by approximately 5, 10, 15, 20 milliseconds (ms). As an example, if UE1 is scheduled in first subband 671 in uplink U SF 645, it uses SRS channel estimates computed during SRS symbol 605 (as UE1 is in first subband 671 only in SRS symbol 605 out of SRS symbols 605, 630, 635, 640), and distance between 645 and 605 corresponds to approximately 20 SFs or 20 ms delay. Similarly, if UE2 is scheduled in the first subband in U SF 645, it uses SRS channel estimates computed during SRS symbol 640 first subband 671, and distance between 645 and 640 corresponds to approximately 5 SFs or 5 ms delay. So, system 100 uses channel estimates computed in SRS, and uses them in U 645.

A channel, i.e., an air medium channel, generally varies with time and speed of a UE. In a given time, variation of a channel, i.e., channel aging, increases with an increase in speed of the UE. That is, as the speed of a UE increases, the period of time during which channel data is valid decreases, and so, the channel data ages more quickly. For a given speed of a mobile UE, channel aging or variation increases with an increase in distance between SRS (605, 630, 635, 640) and DMRS in U 645. Using a channel estimate based on SRS can cause performance degradation because of channel aging when users are moderately to highly mobile. Here, we assume a 15 kilohertz (kHz) subcarrier spacing, one SF (D or U or S) is 1 ms, and one SFN is 10 ms. So, distance between 605 and 645 is approximately 20 SFs or 20 ms.

Figure 7:
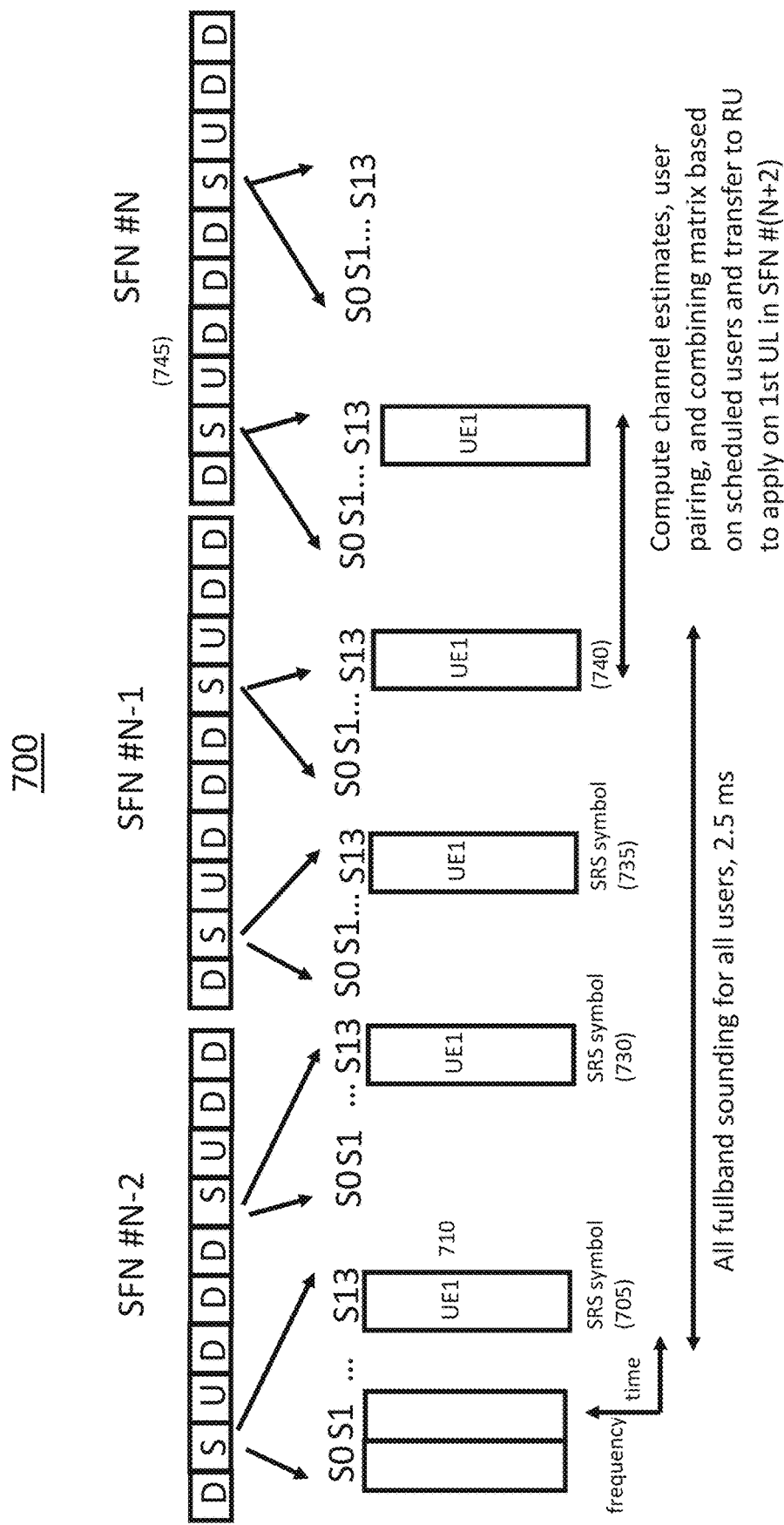
FIG. 7 is a diagram of SRS fullband scheduling for a group of users that forms a multi-user MIMO pool.

FIG. 7 is a diagram of SRS full band scheduling in an example 700, for a group of users that forms the multi-user MIMO pool.

In example 700, the last symbol in the special subframe (SSF) is used as SRS symbol 705, 730, 735, 740 and so on. Frequency is represented vertically, and time is represented horizontally.

A single group of users UE1 710 is scheduled across the entire frequency band. The same group of users is scheduled across the entire frequency band in SRS symbols 705, 730, 735, 740 and so on. Based on SRS symbols 705, 730, 735 and 740, channel estimates of all users in this group are calculated for the entire frequency band. Based on these channel estimates, a user is scheduled to transmit in U SF 745 at SFN N.

As can be seen, depending on the SRS scheduling, the channel estimate is 5 ms old. A user scheduled in any subband in U SF 745 uses channel estimates derived from SRS symbol 740 and the corresponding subband. Using a channel estimate based on SRS can cause performance degradation because of channel aging when users are moderately to highly mobile. Here we assume 15 kHz subcarrier spacing and one SF (D or U or S) is 1 ms, and one SFN is 5 ms. Fullband scheduling results in lesser latency of SRS channel estimates (5 ms) to be used on the DMRS symbol in Uplink SF 745. The same in the case of subband can be as old as 20 ms. Hence, higher speeds of the UE might require fullband scheduling as it is desirable to minimize the distance between DMRS in U 745 and the last SRS (always 740, remember channel variation/aging is dependent on speed of UE and also distance between SRS and DMRS, since speed is high, it is desirable to minimize distance between SRS and DMRS by always choosing SRS 740 to estimate the channel used in U 745) while lower speeds can have subband scheduling (since the speed of UE is lower there can be more distance between SRS 605 and DMRS 645).

System 100 can have a mix of fullband and subband SRS scheduling over the same RBs (time and frequency resource) based on speed of the users.

Let $G_{SRS}$ be the estimate of the channel matrix G 318 (defined below) based on SRS. This is one value for all the SCs in an RB.

Let $H_{SRS}$ be the estimate of the channel matrix H 328 (defined below) based on SRS. This is one value for all the SCs in an RB.

Let $H_{dmrs}$ be the estimate of the channel matrix H 328 based on DMRS. This is one value for all the SCs in an RB.

Let $G_{dmrs}$ be the estimate of the channel matrix G 318 based on DMRS. This is one value for all the SCs in an RB.

Figure 8:
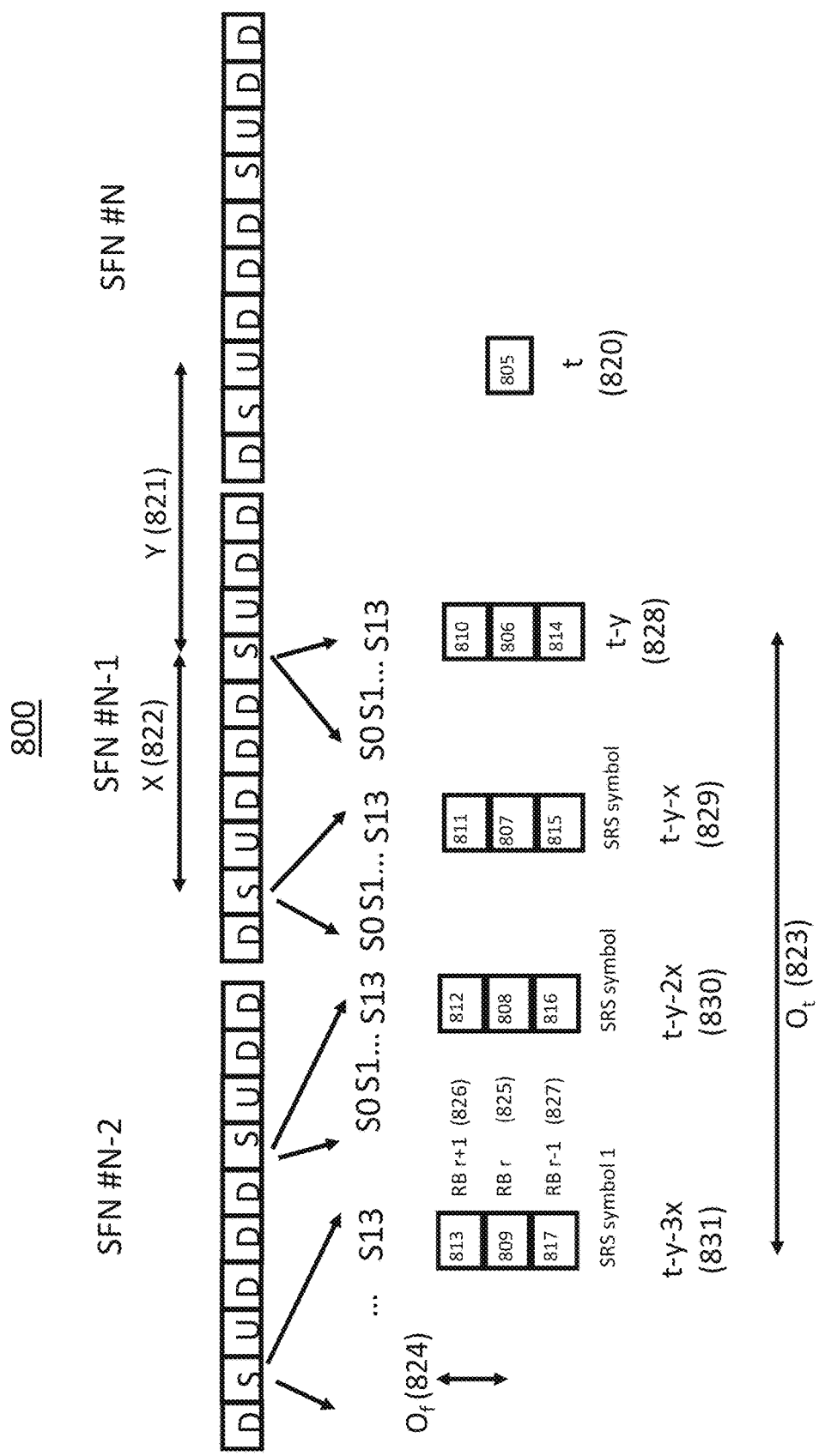
FIG. 8 is a diagram of SRS symbols used in linear prediction.

FIG. 8 is a diagram of SRS symbols used in a linear prediction, and depicts an example 800 of SRS channel estimates for an ith user (desired cell 332/intra-cell 314/316) for a first antenna for many RBs across time. RB 813 is RB r+1 that occurs in an SRS symbol at SF 831 at time t−y−3x. Similarly, RB 809 is RB r and RB 817 is RB r−1, which occurs in an SRS symbol at SF 831 a time t−y−3x. The same definition holds for RBs 812, 808, 816, 811, 807, 815, 810, 806, 814 and 805.

SRS CE module 170 computes one channel estimate per user, per RB, per antenna, per SRS symbol 831, 830, 829, 828. The DMRS symbol in question is in an RB r in an uplink RB r 805 (shown on the right side of FIG. 8), which occurs at SF t 820. The PUSCH of a UE is scheduled in RB r 805 at SF 820 at time t. SRS-based channel estimates are all computed for RBs 806-817 for various RBs for all desired and intra-cell users, and all antennas, by SRS CE module 170.

A distance between two sets of SRS symbols in which the same UE is scheduled is x 822 SFs. For fullband SRS scheduling, x=5, and for subband scheduling, x=20. For example, the distance between channel estimates computed at RB r 806 in SF 828, and RB r 807 in SF 829 is x SFs 822. The distance y 821, between RB r 805 in SF 820 and nearest RB r SRS symbol 806, is y SFs. Y=6, 11, 16, 21 for subband SRS scheduling, and Y=6 for fullband scheduling.

Let $\omega_{i,t,r,a}$ denote the SRS channel estimate for ith desired user, ath antenna, rth RB at SF t computed by SRS CE module 170. $\omega_{1,t-y,r,1}$ is calculated in RB r 806 at SF t-y 828 in first antenna for the first user by SRS CE module 170. Similarly, $\omega_{1,t-y-3x,r+1,1}$ is calculated in RB r+1 813 at SF t−y−3x SF 831 for first antenna and first user.

Let $\theta_{i,t,r,a}$ denote the DMRS channel estimate in Uplink SF (U) for the ith user desired, ath antenna, and rth RB at SF t. $\theta_{i,t,r,a}$ is computed by PUSCH channel estimate module 158 at uplink (U) SF 820 t for RB r 805 for ath antenna.

Let $\bar{\omega}_{i,t,r,a}$ denote the SRS channel estimate for ith intra-cell user, ath antenna and rth RB at SF t, calculated by SRS CE module 170. $\bar{\omega}_{1,t-y,r,1}$ is calculated at SF t−y 828 for RB r 806 for first antenna and first intra-cell user. $\bar{\omega}_{1,t-y-3x,r+1,1}$ is calculated by SRS CE module 170 at SF t−y−3x 831 for RB r+1 813, first intra-cell user and first antenna.

Let $\tilde{\theta}_{i,t,r,a}$ denote the DMRS channel estimate for ith intra-cell user, ath antenna, and rth RB at SF t. $\tilde{\theta}_{i,t,r,a}$ is computed by PUSCH channel estimate module 158 at SF t 820 for RB r 805 for the ath antenna.

Consider processing of the CSF U in SFN N, or DMRS of PUSCH t RB r 805 in SF t 820. The (I,j) elements of $G_{SRS}$, $H_{SRS}$, $H_{DMRS}$, $G_{DMRS}$ for RB r are given by (they correspond to the ith antenna and jth user) $G_{SRS}(i,j)=\omega_{j,t-y,r,i}$, $H_{SRS}(i,j)=\omega_{j,t-y,r,i}$, $H_{DMRS}(i,j)=\theta_{j,t,r,i}$, $G_{DMRS}(i,j)=\tilde{\theta}_{j,t,r,i}$. Note that at RB r 805 and SF t 820, DMRS channel estimates $\theta_{j,t,r,i}$ and $\tilde{\theta}_{j,t,r,i}$ of all desired and intra-cell users ((U+U₁)) for all antennas per RB (a total of (U+U₁)*$N_R$) for the case where O-DU 150 receives all DMRS across all antennas per SC without application of any combining matrix. If a combining matrix is applied, then O-DU 150 gets only M values per subcarrier from O-RU 105. In that case at RB r 805 at SF 820 t DMRS channel estimates (modified by combining matrix) of all desired and intra-cell users ((U+U$_1$)) for M layers per RB is computed by PUSCH channel estimate module 158 (a total of (U+U$_1$)*M). In this case, the DMRS channel estimate (with combining matrix) for ith desired/intra-cell user, ath layer, tth SF and rth RB will be denoted by $\bar{\theta}_{i,t,r,a}$, $\bar{\tilde{\theta}}_{i,t,r,a}$, for desired and intra-cell users, respectively.

Let the number of antennas, i.e., a quantity of antennas, at BS 102 be denoted by N$_R$. The received signal per subcarrier (SC) 404 (see FIG. 4), across all N$_R$ antennas, and after application of ADC 112, FFT and CP removal 114 at point 190 is given by $$y = Hx + Gx_1 + Jx_2 + n$$

Where H 328 (see FIG. 3) is the N$_R$×U channel matrix of the U desired users 330, G 318 is the N$_R$×U$_1$ channel matrix of the U$_1$ intra-cell interferers 316, J is the N$_R$×U$_2$ channel matrix 306 of the U$_2$ inter-cell interferers 304, x, x$_1$, x$_2$, n are the U desired users, U$_1$ intra-cell interferers, U$_2$ inter-cell interferers, and AWGN, respectively. O-RU 105 sends M values 577 (see FIG. 5) per subcarrier 404 to O-DU 150 by applying combining matrix W$_{RU}$ 572. The variance of AWGN is $\sigma^2$. The interference is given as $$I = I_1 + I_2 + n$$

where I$_1$=Gx$_1$ and I$_2$=Jx$_2$.

Signals at BS 102 received from users in desired cell 332 are the desired signals, while signals from intra cells 322, 314 (I$_1$) and inter-cells 312, 302 and 340 (I$_2$), are called intra-cell and inter-cell interferences, respectively. This use case is typically for a cell-edge desired user, where intra-cell and inter-cell interferences are present. The interference covariance matrix is given by C=E{II$^H$}, where E is the expectation operator. The expected value or average value across many subcarriers in an RB of the quantity II$^H$ is called the interference covariance matrix.

Let H$_{DMRS}$ be the estimate of the channel matrix H in the current SF based on DMRS of uplink PUSCH (assuming DMRS of all antennas are sent from O-RU to O-DU, and no combining matrix is applied). This value is constant for all SCs in an RB. The interference covariance matrix is implemented by averaging the quantity (y−H$_{DMRS}$x)(y−H$_{DMRS}$x)$^H$ over the 12 SCs of a RB and is given as (for LTE, i.e., the 4G mobile communications standard)

$$C = 1/12 \Sigma_{RB}(GG^H + JJ^H + \Delta H \Delta H^H) + \sigma^2 \tilde{I}$$

Where ΔH=H−H$_{DMRS}$ for the given SC. The MMSE-IRC estimate of x is given as $\hat{x}$=WY where $$W = (H_{DMRS}{}^H C^{-1} H_{DMRS} + \tilde{I})^{-1} H_{DMRS}{}^H C^{-1}$$

is a per-RB quantity, $\tilde{I}$ is an identity matrix of appropriate dimension.

This is for Split 7.3. In Split 7.3 there is no concept of O-RU, O-DU, combining matrix, fronthaul, etc. All are located at the same place, and there is no fronthaul and combining matrix. Since there is no combining matrix, which, for example, compresses 64 values across all antennas per subcarrier to M=8 values, Split 7.3 usually works with all 64 values of 64 antennas per subcarrier, unlike Split 7.2 O-RAN.

The present disclosure, and the concepts of O-RU, O-DU, combining matrix, etc., are also called O-RAN Split 7.2, which works with only M values per subcarrier at the O-DU. In the absence of interference, and with only AWGN noise, which use case occurs if the user is not at an edge of the cell, but rather at cell center or close to radio BS, the equalizing matrix is $$W = (H_{DMRS}{}^H H_{DMRS} + \sigma^2 \tilde{I})^{-1} H_{DMRS}{}^H$$

For 7.2, M values $\bar{y}$ are sent from O-RU to O-DU, where $\bar{y}$=W$_{RU}$y. The M×N$_R$ combining matrix W$_{RU}$ will be sent to O-RU from O-DU before the current SF (CSF). The received signal at O-DU can be written as $$\bar{y} = \bar{H}x + \bar{G}x_1 + \bar{J}x_2 + \bar{n}$$

where $\bar{H}$=W$_{RU}$H, $\bar{G}$=W$_{RU}$G and $\bar{n}$=W$_{RU}$n. The MMSE-IRC estimate of x is given as $\hat{x}$=W$_{DU}$X where $$W_{DU} = (\bar{H}_{DMRS}{}^H \bar{C}^{-1} \bar{H}_{DMRS} + \tilde{I})^{-1} \bar{H}_{DMRS}{}^H \bar{C}^{-1}$$

$$\bar{H}_{DMRS} = W_{RU} H_{DMRS}$$

$$\bar{C}^{-1} = (W_{RU} C W_{RU}{}^H)^{-1}$$

is used in UL MIMO receiver 580 of O-DU 150. UL MIMO receiver 580 includes modules 154, 156, 158 and 160.

To illustrate the equations, consider an eNB (BS) 102 with N$_R$=64 antennas and 8 users to be supported in UL using MU MIMO. X denotes the 8×1 vector of the modulated symbols of U=8 desired users, H is the channel of dimension 64×8, and Y denotes the received signal (FFT output) at the users, concatenated as single vector of dimension 64×1. Decoding of the UL MU MIMO in Split 7.3 is performed by applying a combining matrix W$_{RU}$ 572 of dimension 8×64 on the received signal Y at point 190.

Figure 9:
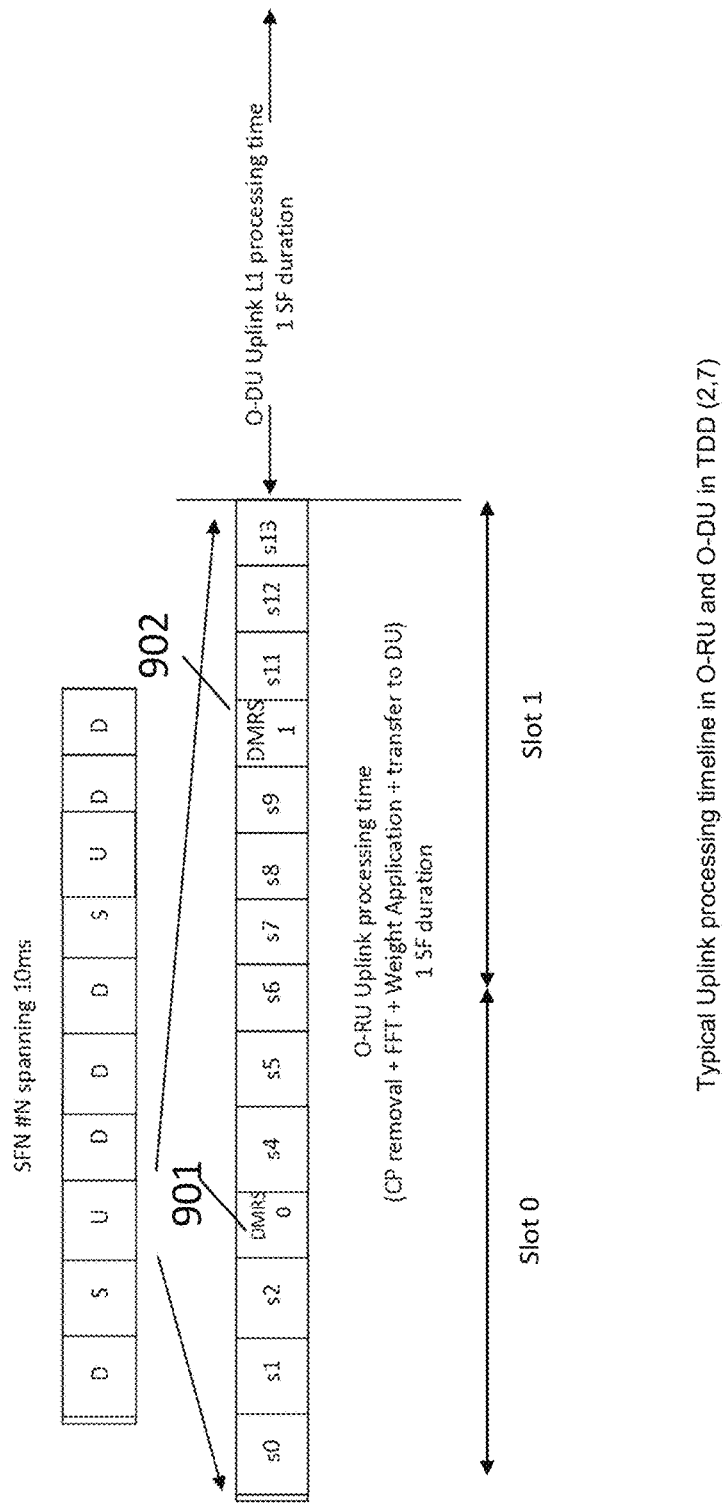
FIG. 9 is a diagram of symbol level operation in uplink processing.

FIG. 9 is a diagram of a symbol level operation in uplink processing. FFT is performed in O-RU 105 for the symbols in an uplink subframe, and these are transferred to O-DU 150. In O-DU 150, the symbols are buffered until all 14 symbols have been received. O-DU 150 processing starts after this and is typically completed during the duration of the next subframe.

Since only the processed data containing the layers (and not the data per antenna for all antennas) are transferred, the fronthaul bandwidth is reduced significantly, i.e., the number of bits (information) to be sent on fronthaul 145 (required bandwidth) is reduced. Typical calculations are as follows.

Assume a TDD (2,7) based massive MIMO (mMIMO) system of 64 antennas and 8 layers in UL MU MIMO. Here, 2 stands for TDD DL/UL configuration 2, and 7 stands for special subframe configuration. A frame has 10 SFs. The frame can have various combinations of D (downlink SF), and U (uplink SF). This is called a configuration number. For example, in FIG. 9, the configuration D, S, U, D, D ,D, S, U, D, D is configuration 2. The internal configuration of special SF (S) can have many types, and as an example here, it is 7.

Bandwidth required for SRS transfer from O-RU 105 to O-DU 150 is 1200 Resource Elements*24 bits (I, Q put together)*2 SRS symbols*64 antennas/1 ms=3.7 Gbps.

Bandwidth required for combining weights transfer from O-DU 150 to O-RU 105 is 100 RBs*24 bits*64 antennas*8 (layers)/1 ms=1.22 Gbps.

Bandwidth required for transferring PUSCH and DMRS from O-RU 105 to O-DU 150 is 1200 Resource Elements*24*14 symbols*8 (layers)/1 ms=3.2 Gbps.

As an illustration of the savings due to combining matrix application in O-RU 105, if the entire processing is done in O-DU 150, the FH 145 bandwidth required for transferring PUSCH and DMRS would be 1200 Resource Elements*24*14 symbols*64(antennas)/1 ms=25.6 Gbps.

Figure 10:
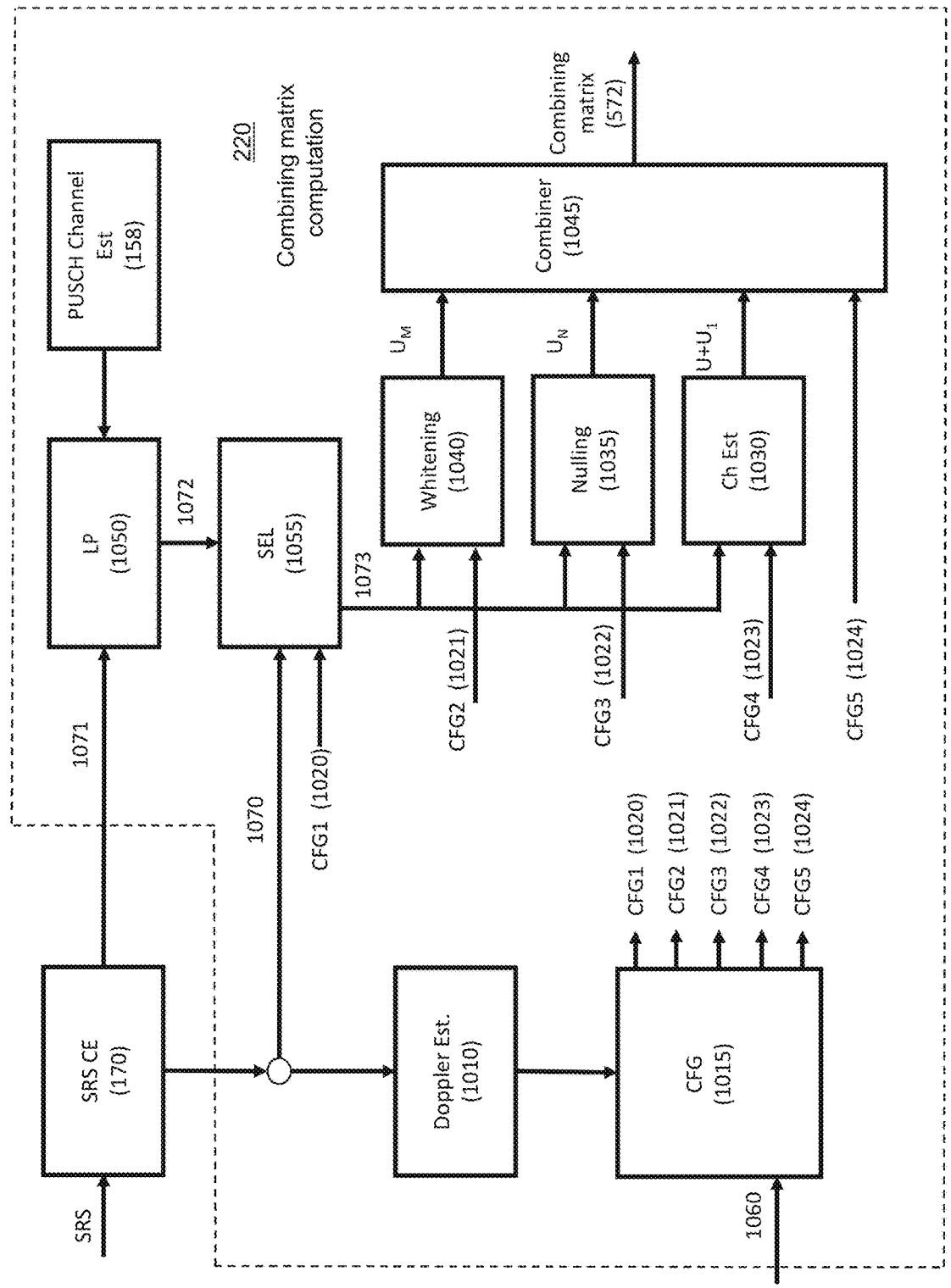
FIG. 10 is a block diagram of a process to construct a combining matrix.

FIG. 10 is a block diagram of a process performed in O-DU 150 by module 220, to construct combining matrix W$_{RU}$ 572. Combining matrix W$_{RU}$ 572 is sent to module 118 in O-RU 105 where it is applied to compress 64 values on 64 antennas ($N_R=64$ as an example) per subcarrier to M values per subcarrier.

Module 220 includes a whitening module 1040, a nulling module 1035, a channel estimate module 1030, and a combiner module 1045.

Whitening module 1040 generates $U_M$ combining vectors, nulling module 1035 generates $U_N$ combining vectors, and channel estimate module 1030 generates a $(U+U_1)$ combining vector. Each combining vector is of dimension $1 \times N_R$. The $M<=U_M+U_N+U+U_1$ combining vectors are combined by combiner module 1045 to generate an $M \times N_R$ combining matrix $W_{RU}$ 572.

Whitening module 1040, null blocking module 1035, and channel estimate module 1030 are controlled by configuration parameters cfg2 1021, cfg3 1022, and cfg4 1023, respectively. Combiner module 1045 is configured by a configuration parameter cfg5 1024.

Many RBs in various SRS symbols are fed to SRS CE module 170, which estimates the channel matrix H 328 and G 318 of the desired and intra-cell users as $H_{srs}$ and $G_{srs}$. These values, along with past estimates (based on SRS symbols prior to the ones used to calculate $H_{srs}$ and $G_{srs}$) of H 328 and G 318 are fed to a Doppler estimator module 1010 that estimates the speed of desired and intra-cell users. This speed information is fed to a configuration module 1015.

There are modules in L1, L2 that specify information 1060 of whether the desired/intra users are cell-edge or cell-center users. Configuration module 1015 receives information 1060.

Configuration module 1015 outputs five configuration parameters, namely, cfg1 1020, cfg2 1021, cfg3 1022, cfg4 1023 and cfg5 1024. Configuration parameters cfg2 1021, cfg3 1022 and cfg4 1023 contain configuration parameters for the operations in whitening module 1040, nulling module 1035, and channel estimate module 1030, respectively. They also specify the number of outputs $U_M$ of whitening module 1040, and $U_N$ of nulling module 1035. Configuration parameter cfg5 1024, to combiner module 1045, specifies how to select M vectors out of $U_M+U_N+U_1+U$ combining vectors to compute the $M \times N_R$ combining matrix $W_{RU}$ 572.

SRS CE module 170 also provides current and past channel estimates of H 328 and G 318 ($H_{srs}$ and $G_{srs}$) to a linear predictor (LP) module 1050 via a path 1071. Refer to the example of FIG. 8, concerning demodulating PUSCH in SF 820 t scheduled at RB r 805. Channel estimates of H 328 and G 318 ($H_{srs}$ and $G_{srs}$) are computed for desired and intra-cell users, respectively. This is done at RB r 806 in U SF at 828 t-y and fed to a SEL module 1055 via a path 1070. All such values of channel estimates are also computed at RBs 813, 809, 817, 812, 808, 816, 811, 807, 815, 810 806, 814 and fed to LP 1050 via path 1071. LP 1050 will use these values to compute an estimate of the channel at RB r 805 SF 820 at time t, which channel estimate is an estimate of H 328 and G 318, denoted by $H_{dmrs}$ and $G_{dmrs}$, respectively.

This estimate of the channel at RB r 805 at SF 820 at time t computed by LP 1050 is fed to SEL module 1055 via a path 1072. Note that $H_{srs}$ and $G_{srs}$ will differ from $H_{dmrs}$ and $G_{dmrs}$ due to channel aging. SEL module 1055 selects one of its inputs based on configuration parameter cfg1 1020, and routes that selected input to whitening module 1040, nulling module 1035 and channel estimate module 1030. Normally, if channel aging is adverse, it would be desirable to compensate the channel aging by using estimates of channel $H_{dmrs}$ and $G_{dmrs}$ received via path 1072. cfg1 1020 would control SEL module 1055 to select the output of LP module 1050 received via path 1072 and pass it on to a path 1073.

If there is no channel aging, $H_{srs}=H_{dmrs}$ and $G_{srs}=G_{dmrs}$. In that case LP is not needed and SRS CE module 170 output via path 1070 is good enough. In this case cfg1 1020 would control SEL module 1055 to select the output of SRS CE 170 obtained via path 1070, and pass it on to path 1073. Channel aging is dependent on speed and that information comes from CFG 1015. The output to path 1073 of SEL module 1055 is provided as input to whitening module 1040, nulling module 1035 and channel estimate module 1030.

A method is given to select the best (by energy) antennas out of the $N_R$ antennas. Let this method be called $\psi$. Let the channel matrix be denoted by H. The, selected indices of the antennas, denoted by a column vector z is determined as follows.

$$[z\ z_2]=\psi(H)=\text{sort}(\sigma_{columns}H.* H^*, \text{'descend'})$$

Basically, we get a column vector where each element, $z_1(i)$, is obtained as $z_1(i)=\Sigma_{j=1}^{U}|H(i,j)|^2$ which is the sum of the energy of each element in the ith row. The vector z is obtained by sorting $z_1$ in descending order (top to bottom) and assigning the indices of sorted $z_1$ to z. $z_2$ is a sorted form of $z_1$. For example, if $z_1=[4\ 2\ 8\ 7]$, z will be $[3\ 4\ 1\ 2]$, $z_2=[8\ 7\ 4\ 2]$.

In system 100, constructing matrix $W_{RU}$ 572 includes:
(a) multiplying a received signal vector with a whitening vector, thus converting colored interference in the received signal vector into white interference, wherein the whitening vector is based on channel estimates from past sounding reference signal symbols.
(b) reducing interference by multiplying a received signal vector with a nulling vector, wherein the nulling vector is based on channel estimates from past sounding reference signal symbols.
(c) estimating channel values from past sounding reference signals, thus yielding estimated channels; and using a conjugate of the estimated channels in the combining matrix.

Figure 11:
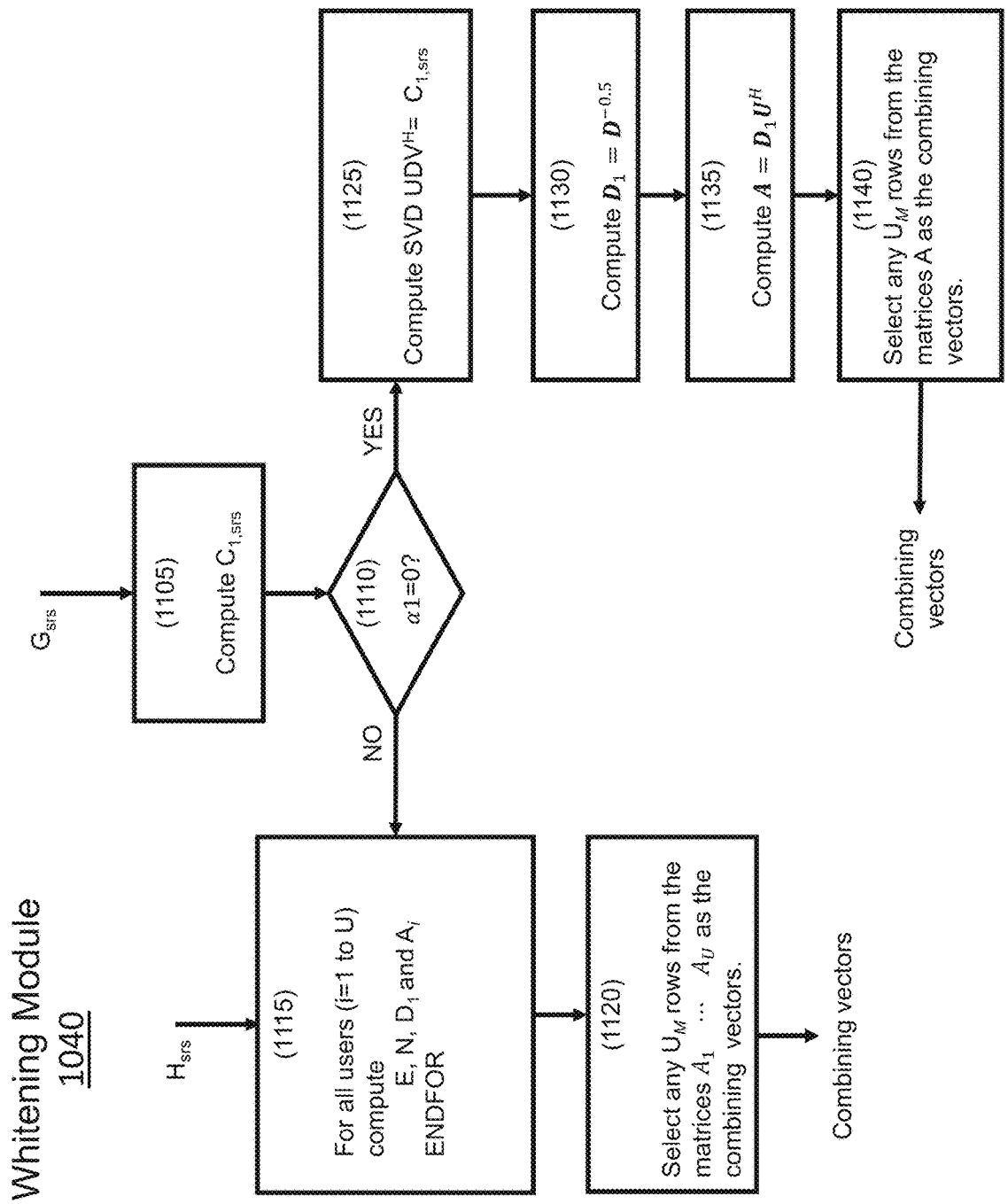
FIG. 11 is a flowchart of a whitening module.

FIG. 11 is a flowchart of operations performed by whitening module 1040. Based on statistics of interference, we can classify interference in two types. Colored interference and white interference. Colored interference can be converted to white interference by matrix multiplication of a matrix called a whitening matrix. The whitening matrix is computed from noise or an interference covariance matrix. Whitening module 1040 produces the $U_M$ combining vectors.

$\alpha_1$ and $\alpha_2$ are either 0 or 1 and are provided as part of cfg2 1021. $\alpha_1$ and $\alpha_2$ will control whether system 100 will use the interference covariance matrix and/or desired channel matrix $H_{srs}$ combination for whitening module 1040.

$G_{SRS}$ is fed to module 1105, which computes the interference covariance matrix of the intra-cell interferes, based on SRS, as $$C_{1,srs}=G_{srs}G_{srs}^H+\sigma^2 \tilde{I}$$

At module 1110, check for the value $\alpha_1$, which is part of cfg2 1021. If $\alpha_1$ is not equal to 0, proceed to module 1115. If $\alpha_1$ is equal to zero, proceed to module 1125.

In module 1115, for each of the U desired users, do the following. For the ith user (I varies from 1 to U):
(a) Compute Matrix E by deleting the ith column of $H_{srs}$.
(b) Compute Matrix N as $N=\alpha_1 EE^H+\alpha_2 C_{1,srs}$.
(c) Let the singular value decomposition of N be $UDV^H=N$.
(d) Create $D_1=D^{-0.5}$. Here, $D^{-0.5}$ denotes a diagonal matrix whose diagonal elements are the reciprocal of the square root of diagonal elements of D.

(e) Compute $A_i = D_1 U^H$. Note that rows of $A_i$ will whiten the interference from intra-cell users and desired users other than the ith user.

(f) Apply antenna selection $[\bar{z}_i\ \tilde{z}_i] = \psi(A_i H_{srs}(:,i))$. This helps select whitening vectors of intra-cell interference and desired users (other than the ith desired user) that maximizes the signal energy of the ith desired user.

(g) End of for loop.

In module 1120, select the M vectors of the combining matrix as follows.

Select U vectors at a time as follows.

(a) Sort $\tilde{z}_1(1), \tilde{z}_2(1), \ldots, \tilde{z}_U(1)$ in descending order. Let the sorted order be for example, $\tilde{z}_U(1), \tilde{z}_1(1), \ldots, \tilde{z}_2(1)$.

(b) Select the first U rows of combining matrix as $A_U(\bar{z}_U(1),:), A_1(\bar{z}_1(1),:), \ldots, A_2(\bar{z}_2(1),:)$.

(c) Now select the next U vectors.

(d) Sort $\tilde{z}_1(2), \tilde{z}_2(2), \ldots, \tilde{z}_U(2)$ in descending order. Let the sorted order be $\tilde{z}_1(2), \tilde{z}_2(2), \ldots, \tilde{z}_1(2)$.

(e) Select the next U rows of combining matrix as $A_U(\bar{z}_U(2),:), A_2(\bar{z}_2(2),:), \ldots, A_1(\bar{z}_1(2),:)$.

(f) Continue until $U_M$ vectors are selected for combining matrix.

(g) Alternatively, select any $U_M$ rows from the matrices $A_1 \ldots A_U$ as the combining vectors.

Looking again at module 1110, if $\alpha_1 = 0$ in cfg2 1021, then:

(a) Module 1125 computes singular value decomposition of $C_{1,srs}$ as $UDV^H = C_{1,srs}$.

(b) Module 1130 computes $D_1 = D^{-0.5}$. Here $D^{-0.5}$ denotes a diagonal matrix whose diagonal elements are the reciprocal of the square root of diagonal elements of D.

(c) Module 1135 computes $A = D_1 U^H$. Note that rows of A will whiten the interference from intra-cell users.

(d) Apply antenna selection $[\bar{z}\ \tilde{z}] = \psi(AH_{srs})$. This helps select those whitening vectors of intra-cell interference that maximizes the signal energy of the desired users.

(e) Module 1140 selects $U_M$ rows of A, $A(\bar{z}(1),:), \ldots, A(\bar{z}(U_M),:)$, as combining vectors. Alternatively, any $U_M$ rows of A can be selected as the combining vectors.

Figure 12:
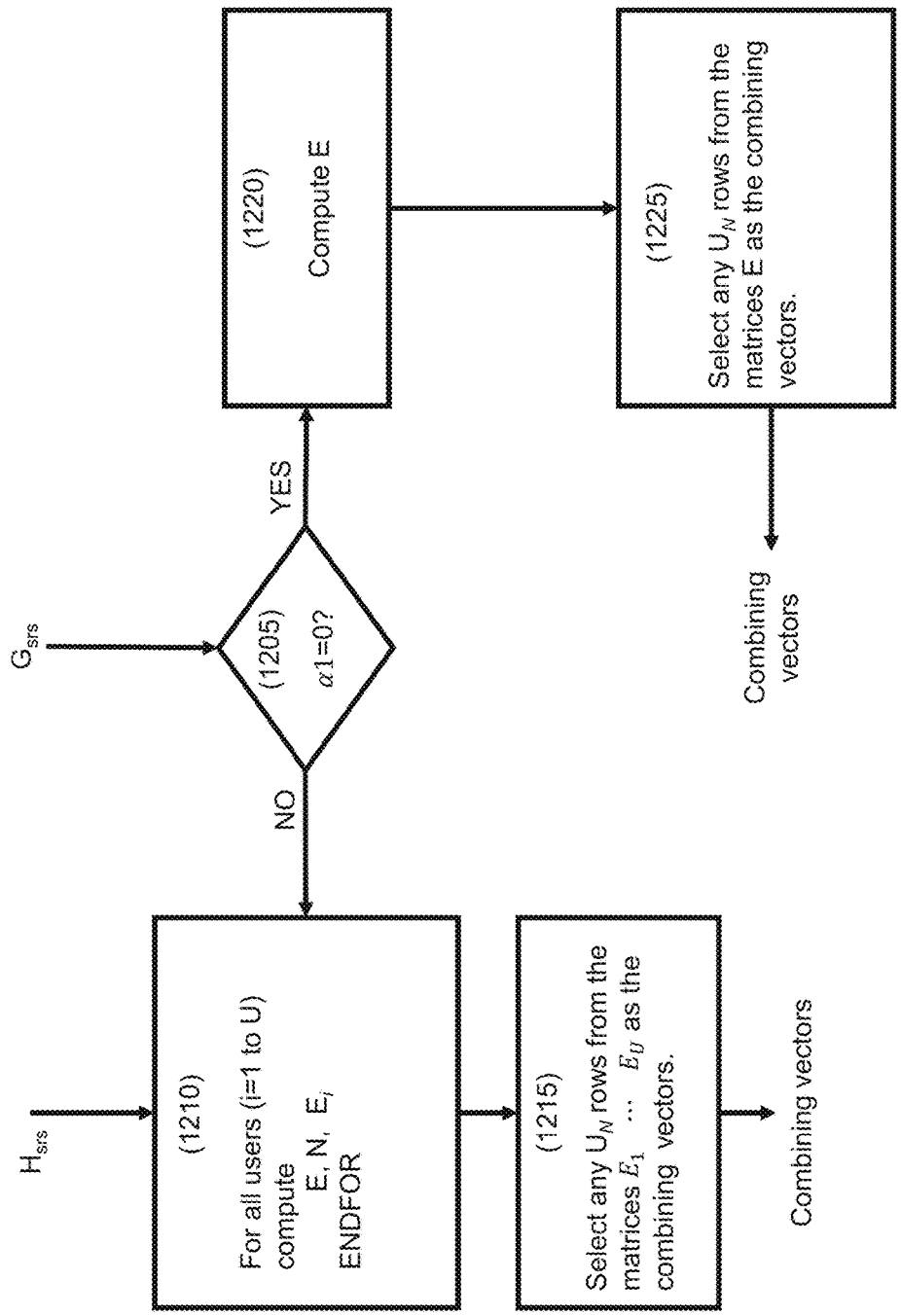
FIG. 12 is a flowchart of a nulling module.

FIG. 12 is a flowchart of operations performed by nulling module 1035. Nulling is a process in which interference is reduced, and preferably made zero, by multiplying a received signal matrix (comprising desired signal and interference) with a nulling vector. The product of a nulling vector and an interference channel matrix, like $G_{srs}$, is zero. As mentioned above, nulling module 1035 reduces interference by multiplying a received signal vector with a nulling vector. The nulling vector is based on channel estimates from past SRS symbols. Nulling module 1035 generates $U_N$ combining vectors.

$\alpha_1$ and $\alpha_2$ are either 0 or 1 and are provided in cfg3 1022. $\alpha_1$ and $\alpha_2$ will control whether system 100 will use the $G_{srs}$ and/or desired channel matrix $H_{srs}$ combination for nulling module 1035.

Let $G_{SRS}$ be the estimate of the channel matrix G based on SRS. This is one value for all the SCs in an RB.

At module 1205, check the value of $\alpha_1$, which is provided in cfg3 1022. If $\alpha_1 \neq 0$, then proceed to module 1210.

In module 1210, for each of the U desired users do the following.

For the ith user (I=1 to U)

(a) Compute Matrix E by deleting the ith column of $H_{srs}$.

(b) Compute Matrix N as $N = \alpha_1 E + \alpha_2 G_{srs}$.

(c) Let the null space of N be denoted by $A_i$. We have $A_i N = 0$.

(d) Apply antenna selection $[\bar{z}_i\ \tilde{z}_i] = \psi(A_i H_{srs}(:,i))$. This helps select nulling vectors of intra-cell interference and desired users (other than the ith desired user) that maximizes the signal energy of the ith desired user.

(e) End of For loop.

In module 1215, select any $U_N$ vectors from $A_1, A_2, \ldots, A_U$ as the combining vectors. Alternatively, system 100 can select U vectors at a time as follows.

(a) Sort $\tilde{z}_1(1), \tilde{z}_2(1), \ldots, \tilde{z}_U(1)$ in descending order. Let the sorted order be for example, $\tilde{z}_U(1), \tilde{z}_1(1), \ldots \tilde{z}_2(1)$.

(b) Select the first U rows of combining matrix as $A_U(\bar{z}_U(1),:), A_1(\bar{z}_1(1),:), \ldots, A_2(\bar{z}_2(1),:)$.

(c) Now select the next U vectors.

(d) Sort $\tilde{z}_1(2), \tilde{z}_2(2), \ldots, \tilde{z}_U(2)$ in descending order. Let the sorted order be $\tilde{z}_U(2), \tilde{z}_2(2), \ldots, \tilde{z}_1(2)$.

(e) Select the next U rows of combining matrix as $A_U(\bar{z}_U(2),:), A_2(\bar{z}_2(2),:), \ldots, A_1(\bar{z}_1(2),:)$.

(f) Continue until $U_N$ vectors are selected for combining matrix.

Looking again at module 1205, if the configuration is such that $\alpha_1 = 0$, then:

(a) Let the null space of $G_{srs}$ be denoted by E.

(b) In module 1220, compute E. We have $EG_{srs} = 0$.

(c) In module 1225 the combining matrix is given by any $U_N$ rows of E. Alternatively, apply antenna selection $[\bar{z}\ \tilde{z}] = \psi(EH_{srs})$. This helps select those nulling vectors of intra-cell interference that maximizes the signal energy of the desired users. Selects $U_N$ rows of E, $E(\bar{z}(1),:), \ldots, E(\bar{z}(U_N),:)$, as combining vectors.

The output of Ch. Est. 1030 is $R^H$ where R is the channel matrix input to Ch. Est. 1030. Here $R = [H_{srs}\ G_{srs}]$ if input to Ch. Est. 1030 is obtained via paths 1070 and 1073. It is $R = [H_{drms}\ G_{drms}]$ if input to Ch. Est. 1030 is obtained via paths 1071, 1072 and 1073.

We now discuss LP module 1050. LP module 1050 takes as inputs, the various SRS channel estimates of users, for a given antenna, for given RBs 806-817, and linearly combines them to obtain an estimate of the user's DMRS channel at RB r 805 SF 820 t, for the same antenna, user and RB. The linear combination uses weights for linear combining. First the weights $W_{LP}$ need to be learned (training), and then weights $W_{LP}$ can be used. LP module 1050 receives its inputs from SRS CE module 170 via path 1071. SRS CE module 170 provides channel estimates $H_{srs}$ and $G_{srs}$ at all RBs in SF t-y 828, SF t-y-x 829, SF t-y-2x 830 and SF t-y-3x 831. Using these, LP module 1050 estimates $H_{dmrs}$ and $G_{dmrs}$ as $\hat{H}_{dmrs}, \hat{G}_{dmrs}$. These can be used as inputs to whitening module 1040, nulling module 1035, and channel estimate module 1030, instead of $H_{srs}$ and $G_{smrs}$, depending on cfg1 1020. In example 800, we use three RBs, RB r 825, RB r+1 826, and RB r-1 827 for SRS channel estimates, to predict the channel at DMRS of PUSCH in RB r 805 at SF 820 t. We use one neighboring RB on either side of RB r. So, we say the frequency order used in prediction is 824 $O_f = 1$. Similarly, we use SRS symbols 828-831 in the time domain. So, we say time-domain order is 823 $O_t = 4$. We use $O_t*(2*O_f+1) = 12$ SRS channel estimates to predict channel at PUSCH DMRS in RB r 805 at SF 820 time t.

Now we discuss three scenarios of operation of LP module 1050.

In the first scenario, all DMRS across all antennas are sent to O-DU 150 from O-RU 105 without any application of combining matrix. Referring again to FIG. 8, we need to demodulate PUSCH at SF t 820 and RB r 805. Collect all $\omega_{i,t,r,a}$ in RBs 806-817 and SFs 831-828 into a row vector and call it $\beta_{i,t,r,a}$. Stack all $\beta_{i,t,r,a}$ for a=1 to $N_R$ to get a matrix $\beta_{i,t,r}$. The $O_t*(2*O_f+1) \times 1$ column vector of LP coefficients are denoted by $W_{LP}$. Collect all $\theta_{i,t,r,a}$ from RB r 805 and SF 820 at time t for antennas a=1 to $N_R$ into a column vector and call it $\gamma_{i,t,r}$. We have the relation $\beta_{i,t,r} W_{LP} = \gamma_{i,t,r}$. This is called the LP-equation. The LP equations at $t_1 < t$, $t_2 < t$, etc., can be used to learn WLP for the ith desired user, and we can use $\beta_{i,t,r} W_{LP}$ at t to compute $\gamma_{i,t,r}$, and use the elements of $\gamma_{i,t,r}$ to compute estimate of $H_{dmrs}$, which can be used in computation of combining matrix $W_{RU}$ 572. Note that the (i,j)th element of $H_{dmrs}$ is $H_{DMRS}(i,j)=\theta_{j,t,r,i}$, and $\theta_{j,t,r,i}$ are all elements of $\gamma_{i,t,r}$. Similarly, the above procedure is repeated for the ith intra-cell user by using $\tilde{\omega}_{i,t,r,a}$ and $\tilde{\theta}_{i,t,r,a}$, to build $\beta_{i,t,r}$, $\gamma_{i,t,r}$, learn $W_{LP}$ for the ith intra user and arrive at estimate of $G_{dmrs}$.

In the second scenario, we use a combining matrix to transfer M values from O-RU 105 to O-DU 150, even for the DMRS. We build $\beta_{i,t,r}$ as before, for both desired and intra-cell users. We build $\bar{\gamma}_{i,t,r}$ by using M values of $\bar{\theta}_{i,t,r,a}$ (desired users) or $\tilde{\bar{\theta}}_{i,t,r,a}$ (intra-cell users) for a=1 to M, stack them one above another into a column vector. For learning, the equation is $W_{RU} \beta_{i,t,r} W_{LP}=\bar{\gamma}_{i,t,r}$ at $t_1 < t$, $t_2 < t$, etc., and $W_{RU}$ is the combining matrix used at times $t_1$, $t_2$, etc. Once $W_{LP}$ for a particular user is learned from the equation $W_{RU} \beta_{i,t,r} W_{LP}=\bar{\gamma}_{i,t,r}$ at $t_1 < t$, $t_2 < t$, etc., we compute $\beta_{i,t,r} W_{LP}=\gamma_{i,t,r}$. From elements of $\gamma_{i,t,r}$, we extract elements $\theta_{i,t,r,a}$ (for desired user) or $\tilde{\theta}_{i,t,r,a}$ (intra-cell user) and then estimate $H_{dmrs}$ or $G_{dmrs}$ as $H_{DMRS}(i,j)=\theta_{j,t,r,i}$, $G_{DMRS}(i,j)=\tilde{\theta}_{j,t,r,i}$. We need to ensure that $M>=O_t*(2*O_f+1)$. Here $>=$ means greater than or equal.

In the third scenario, LP coefficients $W_{LP}$ will be learned only from SRS, and used for constructing combining matrix $W_{RU}$ 572. This corresponds to the case where M values of DMRS are sent from O-RU 105 to O-DU 150. This is based on the following scenario.

Figure 13:
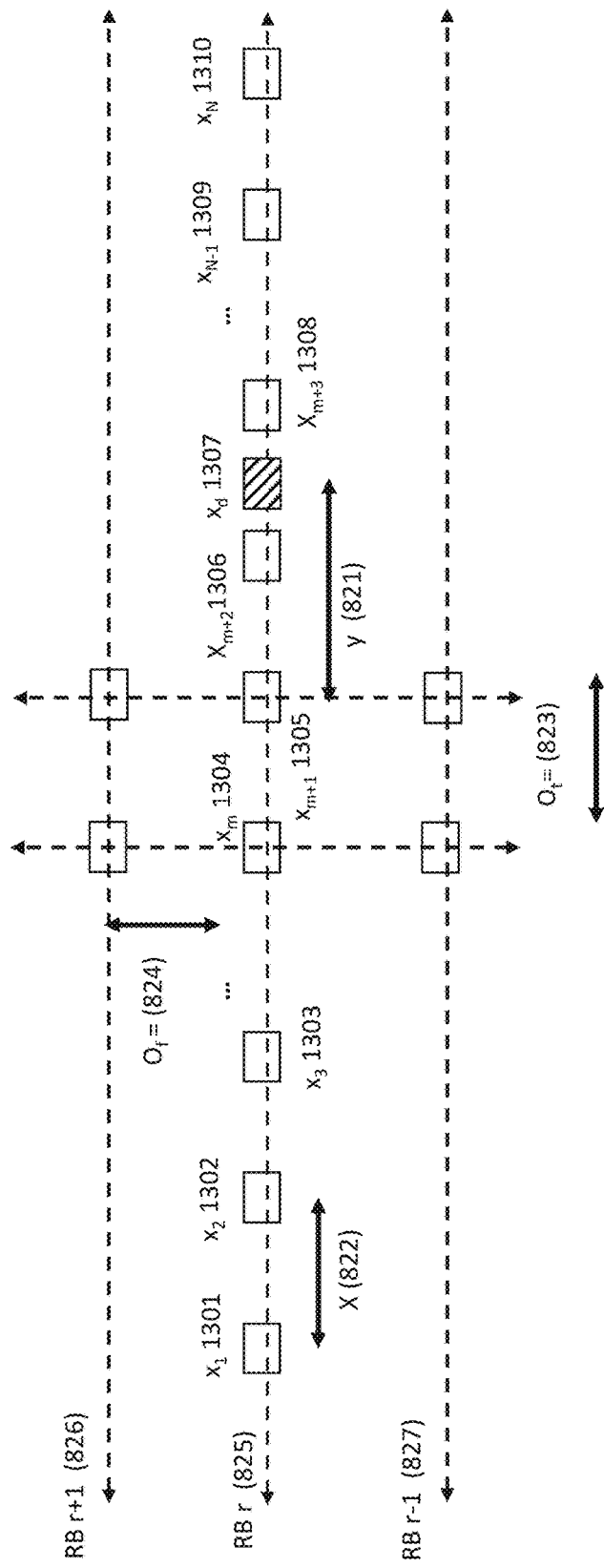
FIG. 13 is a block diagram of a use of SRS symbols in a linear prediction.

FIG. 13 is a block diagram of an example 1300 of a use of SRS symbols in a linear predication. Suppose a continuous time signal is sampled above the Nyquist sampling rate and we get the N equidistant samples $x_1, x_2, x_3, \ldots, x_m, x_{m+1}, x_{m+2}, x_{m+3}, \ldots, x_{N-1}, x_N$. Here, all of the x refer to channel estimates of any desired user or intra cell user for any antenna calculated at an RB and SF. For example, x1 can be a channel estimate of a desired user or intra cell user in any antenna calculated at RB r 825 in SRS SF 1301. If we need to estimate a sample value $x_d$ between $x_{m+2}$ and $x_{m+3}$, we can do so using Nyquist sampling theorem, also known as reconstruction using Nyquist-Shannon sampling theorem. Ideally speaking, to estimate xd, we would need infinite samples on either side of $x_d$ (past and future), but error in estimation becomes negligible even with finite samples on either side of $x_d$. Example 1300 has a plurality of SRS symbols in RB r+1 826, RBs r 825 and RB r−1 827. In RB r 825, there are SRS symbols in SFs 1301, 1302, 1303, . . . , 1304, 1305, 1306, 1308, . . . , 1309, 1310. As discussed above, each of the x % corresponds to channel estimation of a desired or intra-cell user estimated in an RB and corresponding SF for an SRS symbol. We will explain only in terms of the ith desired user, and the same can be extended to all desired and intra users. All of the channel estimates $x_1, x_2, x_3, \ldots, x_m, x_{m+1}, x_{m+2}, x_{m+3}, \ldots, x_{N-1}, x_N$ computed in their corresponding RBs and SFs, and these SFs are spaced x SFs 822 apart. It is desired to estimate the ith desired user's channel $x_d$ in SF 1307 in RB r occurring between SRS symbols $X_{m+2}$ SF 1306 and $x_{m+3}$ in SF 1308 which is y 821 SFs away from $x_{m+1}$, where y is a value between x and 2x. This is accomplished using Nyquist sampling theorem and using values $x_1, x_2, x_3, \ldots, x_m, x_{m+1}, x_{m+2}, x_{m+3}, \ldots, x_{N-1}, x_N$.

Thus, $x_d$ is estimated using Nyquist sampling reconstruction theorem or any of its advanced variants.

Now having estimated $x_d$ in SF 1307, we show how to learn LP coefficients $W_{LP}$ for the ith desired user.

In FIG. 13, we use $O_t$ 823=2, $O_f$ 824=1. Time instant is t at RB r SF 1307. Collect all elements $\omega_{i,t-y,r,a}$ at SF 1305 and RB r 825, $\omega_{i,t-y-x,r,a}$ at SF 1304 RB r 825, $\omega_{i,t-y,r+1,a}$ at SF 1305 RB r+1 826, $\omega_{i,t-y-x,r+1,a}$ at SF 1304 RB r+1 826, $\omega_{i,t-y,r-1,a}$ at SF 1305 RB r−1 827, $\omega_{i,t-y-x,r-1,a}$ at SF 1304 RB r−1 827 (in that order) into a row vector and call it $\beta_{i,t,r,a}$. Stack all $\beta_{i,t,r,a}$ for a=1 to NR to get a matrix $\beta_{i,t,r}$. The $O_t*(2*O_f+1) \times 1$ column vector of LP coefficients are denoted by $W_{LP}$. Collect all $\theta_{i,t,r,a}$ at SF 1307 RB r 825 or $x_d$ for antennas a=1 to $N_R$ into a column vector and call it as $\gamma_{i,t,r}$. We have the relation $\beta_{i,t,r} W_{LP}=\gamma_{i,t,r}$. This is called the LP-equation. We use this to learn $W_{LP}$. The LP equations at $t_1 < t$, $t_2 < t$, t, etc., can be used to learn $W_{LP}$ for the ith desired user as well, and we can use $\beta_{i,t3,r} W_{LP}$ at $t_3 > t$ to compute $\gamma_{i,t3,r}$, and use the elements of $\gamma_{i,t3,r}$ to compute estimate of $H_{dmrs}$, which can be used in computation of combining matrix $W_{RU}$ 572. Note that the (i,j)th element of $H_{dmrs}$ is $H_{DMRS}(i,j)=\theta_{j,t3,r,i}$ and $\theta_{j,t3,r,i}$ are all elements of $\gamma_{i,t3,r}$. Similarly, the above procedure is repeated for the ith intra-cell user by using $\tilde{\omega}_{i,t,r,a}$ and $\tilde{\theta}_{i,t,r,a}$ to build $\beta_{i,t,r}$, $\gamma_{i,t,r}$, learn $W_{LP}$ for the ith intra user, and arrive at estimate of $G_{dmrs}$.

Thus, in system 100, constructing combiner matrix $W_{RU}$ 572 includes: learning linear prediction (LP) coefficients from:
 (a) sounding reference signals (SRS); or
 (b) sounding reference signals (SRS) and demodulation reference signals; or
 (c) sounding reference signals (SRS) and compressed demodulation reference signals, and thereafter:
 using the LP coefficients to predict a channel in a current subframe based on channel values from past SRS symbols, thus yielding a predicted channel for the current subframe;
 computing a whitening vector from the predicted channel;
 computing a nulling vector from the predicted channel;
 computing a conjugated channel vector from conjugated values of the predicted channel; and
 constructing the combining matrix from the whitening vector, the nulling vector, and the conjugated channel vector.

Figure 14:
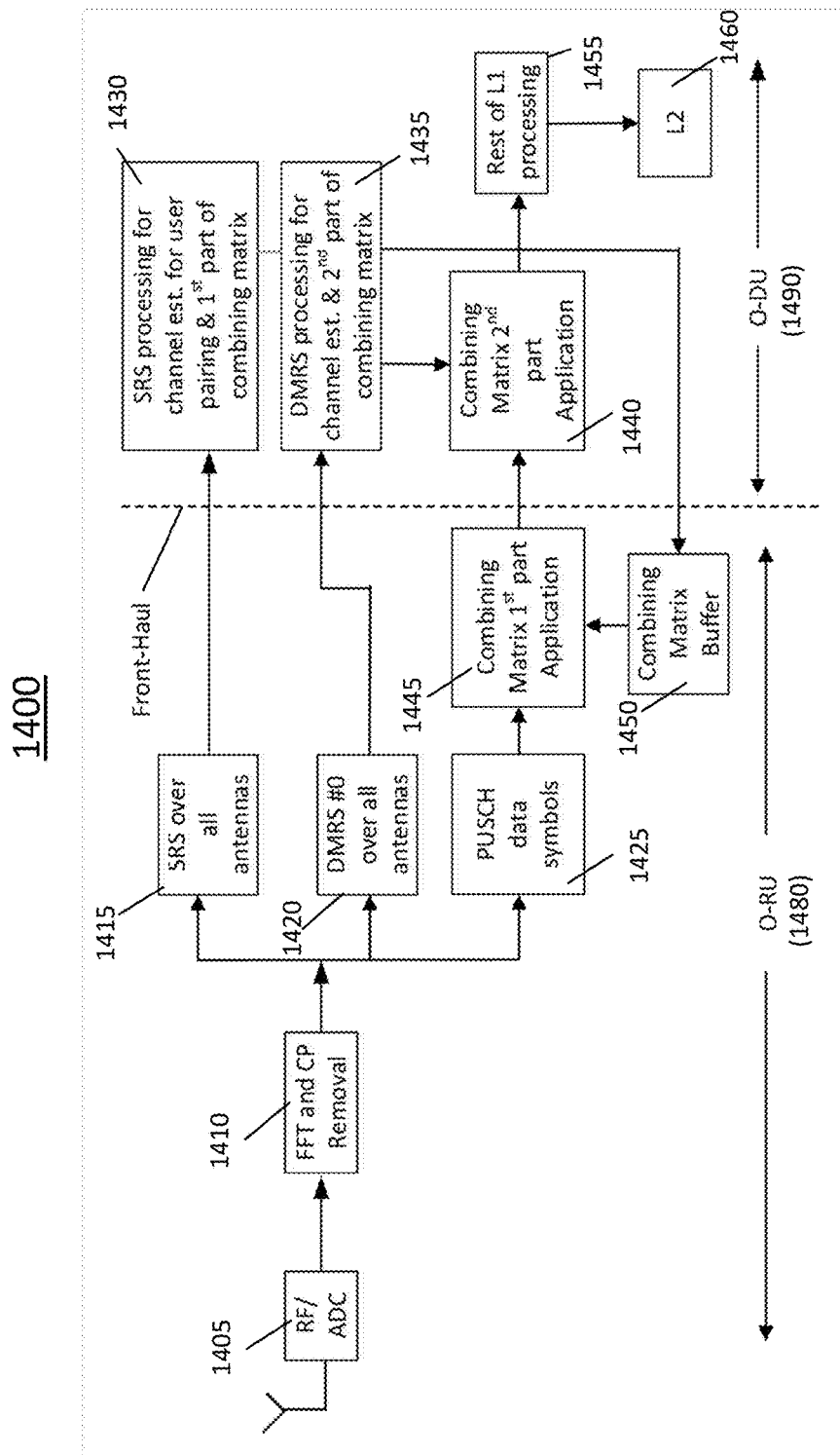
FIG. 14 is a block diagram of a process of using a combining matrix.

FIG. 14 is a block diagram of a process 1400 of using a combining matrix. The combining matrix is split into two parts. One of the parts is applied in an O-RU 1480, and the other one in an O-DU 1490. The O-RU 1480 and O-DU 1490 are architecturally different from O-RU 105 and O-DU 150. For instance, O-RU 105 might or might not send DMRS of all antennas to O-DU 150, whereas O-RU 1480 always sends all DMRS of all antennas to O-DU 1490. O-DU 1490 processes all DMRS of all antennas from O-RU 1480, while O-DU 150 will process only what is sent from O-RU 105.

Module 1405 receives RF and performs ADC.

Module 1410 performs FFT and CP removal, and module 1415 transfers SRS over all antennas to module 1430 in O-DU 1490. Module 1430 performs SRS channel estimation, user pairing and computes a first part of combining matrix $H^H_{srs}$ given below. This is sent to module 1450 combining matrix buffer over fronthaul 145. This first part of the combining matrix is applied in module 1445 on PUSCH data symbols only from module 1425, and the output is sent to O-DU 1490, where O-DU 1490 applies a second part of combining matrix in module 1440. An output of module 1440 is sent to module 1455 for further L1 processing, and module 1460 for further L2 processing. Module 1420 sends DMRS of the PUSCH in CSF over all antennas to module 1435, where channel estimates are obtained based on this DMRS and applied to module 1440 as the second part of the combining matrix.

The combining matrix is split as $$W_{RU} = H_{srs}^H \qquad \text{(equation 14.1)}$$

$$W_{DU} = (H_{srs}^H H_{srs} + \sigma^2 \tilde{I})^{-1} \qquad \text{(equation 14.2)}$$

where $H_{srs}$ is the $N_R \times U$ channel matrix based on SRS calculated in module 1430, and hence, is readily available at O-RU 1480 before the start of the uplink subframe CSF. This channel estimate is constant for all SCs of the RB in question. This matrix reduces the dimension of received signal Y from $N_R$ to U per subcarrier, and the reduced data is transferred from O-RU 1480 to O-DU 1490. O-DU 1490 applies $W_{DU}$ on this data to achieve data decoding. The matrix $W_{DU}$ is constructed using the channel estimate either from the DMRS of the PUSCH in uplink SF or the SRS that is transferred over all the available antennas to O-DU 1490. Note that DMRS symbols are sent at symbol numbers 3 and 10 along with the PUSCH symbols in an uplink (u) SF. So, the equations 14.1 and 14.2 become $$W_{RU} = H_{srs}^H \qquad \text{(equation 14.3)}$$

$$W_{DU} = (H_{dmrs}^H H_{dmrs} \sigma^2 \tilde{I})^{-1} \qquad \text{(equation 14.4)}$$

Process 1400 usually works best at low speeds when channel aging is not an issue and the UE is not at cell edge.

As can be seen, the channel estimate using DMRS in Uplink SF PUSCH, which does not have an aging issue, is used to compute $W_{DU}$. The channel aging issue in the $W_{RU}$ matrix that is based on channel estimate from SRS can be further minimized by applying linear prediction filters and/or Kalman filters. The linear predictors and/or Kalman filters work on past SRS symbols of a user to predict the current DMRS value. The fronthaul bandwidth required for transferring PUSCH over 8 layers and DMRS over 64 antennas from O-RU to O-DU is (1200*24*12*8+1200*2*2*64)/1 ms=6.45 Gbps.

Process 1400 works well for cell center UEs where inter-cell interference is expected to be negligible.

Figure 15:
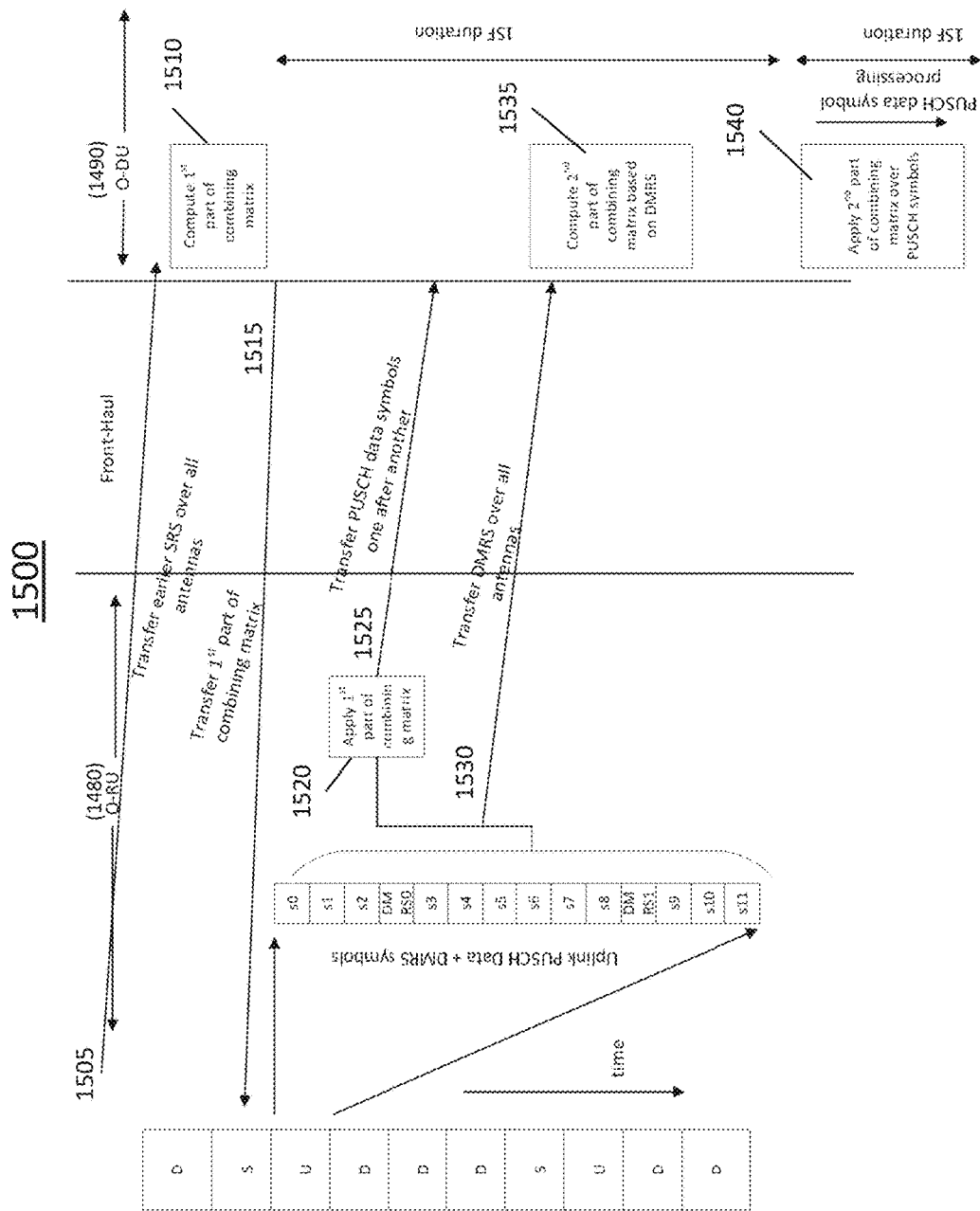
FIG. 15 is a diagram of a session of communication between an O-RU and an O-DU.

FIG. 15 is a diagram of a session 1500 of communication between O-RU 1480 and O-DU 1490 for process 1400. Though illustrated here in FIG. 15 for LTE TDD(2,7), similar processing can be applied for other LTE TDD formats and 5G NR TDD systems as well.

In operation 1505, O-RU 1480 sends the SRS over all antennas.

In operation 1510, O-DU 1490 computes channel estimates, and performs user pairing.

In operation 1515, O-DU 1490 transfers the first part of the combining matrix before the start of the uplink subframe.

In operation 1520, O-RU 1480 applies the first part of the combining matrix on all data OFDM symbols of PUSCH In operation 1525, O-RU 1480 transfers the PUSCH data symbols.

In operation 1530, O-RU 1480 transfers DMRS symbols (without any multiplication or combining matrix) over all antennas.

In operation 1535, O-DU 1490 computes the second part of the combining matrix.

In operation 1540, O-DU 1490 prepares to process the uplink PUSCH data symbols once all the symbols have been received over the next subframe duration.

Though FIGS. 14 and 15 show only the first DMRS being used, both the DMRS symbols can be processed in similar manner.

Figure 16:
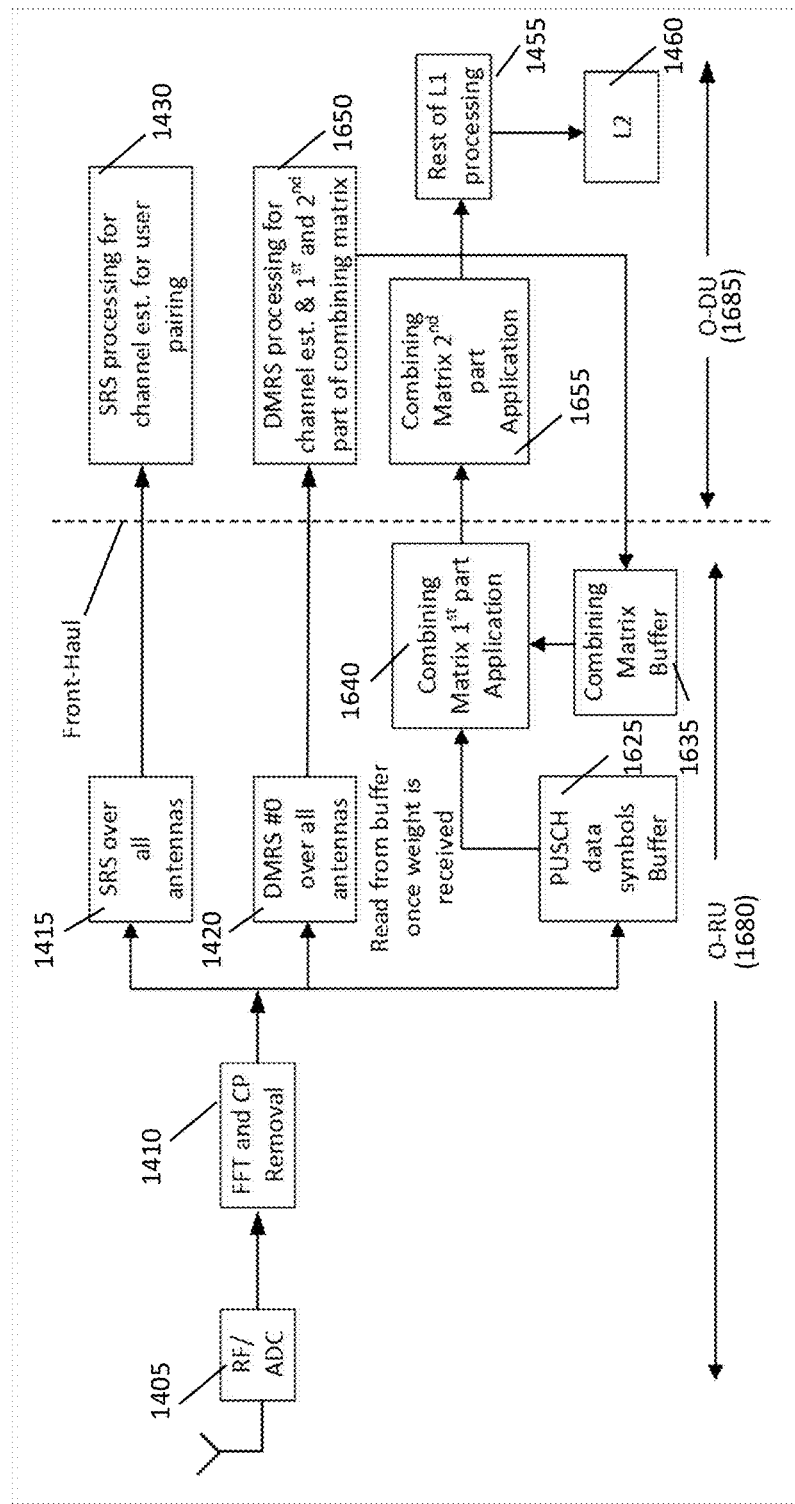
FIG. 16 is a block diagram of a process that provides optimal performance in the presence of inter-cell interference.

FIG. 16 is a block diagram of a process 1600 that provides optimal performance in the presence of inter-cell interference. In process 1600, O-RU 1680 buffers up the PUSCH data symbols s0 to s13 in CSF after doing FFT, and in module 1420 transfers, to O-DU 1685, the FFT output of first DMRS over all antennas. O-DU 1685, in module 1650, performs channel estimation over the first DMRS of PUSCH in CSF, computes the interference covariance matrix corresponding to both intra-cell and inter-cell interferers, the first part of the combining matrix $W_{ru}$, and transfers this weight matrix to O-RU 1680 over next few symbols. O-RU 1680, in module 1625, reads the buffered up PUSCH data symbols one after another. Module 1640 applies the first part of combining matrix from module 1635 on PUSCH data symbols from module 1625, reducing the dimension from antennas to layers, and transfers the data to O-DU 1685. O-DU 1685, in module 1655, applies the second part of the combining matrix $W_{du}$ to decode the data. As explained, the matrices are $$W_{ru} = H_{DMRS}^H C^{-1} \qquad \text{(equation 16.1)}$$

$$W_{du} = (H_{DMRS}^H C^{-1} H_{DMRS} + \tilde{I})^{-1} \qquad \text{(equation 16.2)}$$

Figure 17:
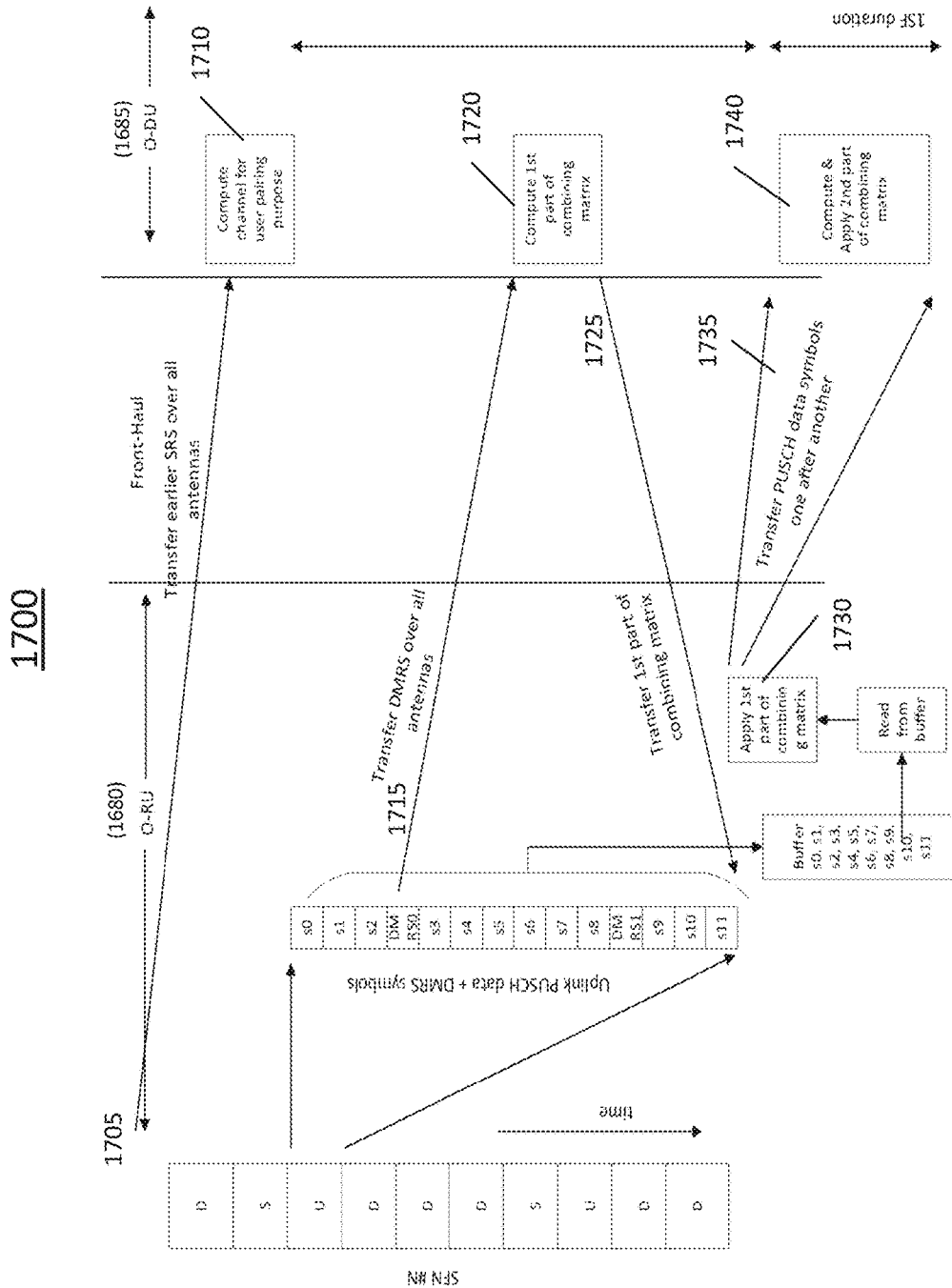
FIG. 17 is a diagram of a session of communication between an O-RU and an O-DU.

FIG. 17 is a diagram of a session 1700 of communication between 0-RU 1680 and O-DU 1685 for process 1600.

As mentioned above, although illustrated for LTE TDD (2,7), the same processing can be applied for other LTE TDD formats and 5G NR TDD systems as well.

In operation 1705, O-RU 1680 sends the SRS over all antennas to O-DU 1685.

In operation 1710, O-DU 1685 uses the SRS for channel estimation, and thereafter uses the channel estimates for user pairing and scheduling.

In operation 1715, when PUSCH uplink symbols arrive on air in CSF, O-RU 1680 buffers the PUSCH data symbols into a buffer and transfers the first DMRS of PUSCH SF over all antennas in the next few symbol duration to O-DU 1685.

In operation 1720, O-DU 1685 computes the first part of the combining matrix over next few symbol durations.

In operation 1725, O-DU 1685 transfers the first part of the combining matrix to O-RU 1680.

In operation 1730, O-RU 1680 reads out the PUSCH data symbols from buffer, and applies the first part of the combining matrix.

In operation 1735, O-RU 1680 transfers the PUSCH data symbols to O-DU 1685.

In operation 1740, O-DU 1685 processes the symbols, one after another, as they arrive by applying the second part of the combining matrix.

The fronthaul bandwidth requirements are as follows:
(a) DMRS over 3 symbol duration from RU to DU: 64*24*1200/(3*70e-6)=8.8 Gbps;
(b) first part of the weights over 3 symbol duration from DU to RU: 64*24*8*100/(3*70e−6)=5.85 Gbps; and
(c) PUSCH over 1 ms from RU to DU: (1200*24*12*8)/ 1e-3*1/1e9=2.7 Gbps.

The methods/processes described herein can be performed by an apparatus that is configured of electronic circuitry, which may include a processor and a memory. The processor is an electronic device, e.g., digital circuitry, that executes instructions. The memory is a storage device, e.g., electronic, that is readable by the processor. The memory includes instructions, i.e., a program module, that when read by the processor, cause the processor to execute the methods/processes described herein. The apparatus can be (a) a component of an O-RAN that is communicatively coupled to one or more other components of the O-RAN, or (b) embedded in a component of the O-RAN, (c) distributed among components of the O-RAN in a distributed processing system, or (d) a component that is external to the O-RAN and communicatively coupled to one or more components of the O-RAN. For example, the processor and memory may be components of an O-RU or an O-DU, or distributed among an O-RU and an O-DU. The instructions can also be stored on an external storage device and copied from the external storage device to the memory.

Thus, system 100 includes:
an open distributed unit (O-DU) having a first processor and a first memory that contains first instructions; and
an open radio unit (O-RU) having a second processor and a second memory that contains second instructions that are readable by the second processor,
wherein the first instructions are readable by the first processor to cause the first processor to perform operations of:
  constructing a combining matrix for a resource block; and
  sending the combining matrix to the O-RU; and
wherein the second instructions are readable by the second processor to cause the second processor to perform operations of:
  utilizing the combining matrix to compress signals on $N_R$ antennas per subcarrier into M values, where $N_R$ is a number of antennas, and M is less than $N_R$; and
  sending the M values per subcarrier to the O-DU.

The present document discloses a method for decoding physical uplink standard channel (PUSCH) symbols in an uplink multi-user multiple input multiple output (UL MU MIMO) wherein an overall weight is split into two weights as:
a. a first weight that is applied at a radio unit (RU) using channel estimates from sounding reference signals (SRS) symbols, wherein the SRS symbols over all or some subset of antennas are transferred to a distributed unit (DU) by RU and DU computing this weight and transferring to RU for application; and
b. a second weight that is applied at the DU.

The present document also discloses a method for computing the first weight by extrapolating the channel estimates derived from SRS using Kalman filtering and /or linear predictions to minimize the effects of SRS channel aging.

The present document also discloses a method in which the DMRS symbols in the uplink subframe are also transferred over all the antennas or a reduced subset of antennas from RU to DU (like SRS) using which second weight is computed.

The present document also discloses a method for decoding PUSCH symbols in the presence of inter-cell interference in which:
a. the PUSCH symbols are buffered up in the RU;
b. the first DMRS symbol over all or some subset of antennas is transferred to DU over few symbol durations to reduce FH bandwidth;
c. the first part of the MMSE-IRC weights is computed over few symbol durations to lessen DU computational cost and transferred over few symbol durations to RU;
d. RU applying the first part on the buffered PUSCH symbols and transferring the PUSCH symbols from that time onwards one by one to DU along with the second DMRS symbol over all antennas; and
e. DU applying the second part of the MMSE-IRC combining weights to decode the PUSCH symbols.

The present document also discloses a method for decoding PUSCH symbols in the presence of inter-cell interference, in which:
a. a first combining matrix based on FFT matrix or antenna selection matrix is applied on the PUSCH symbols in the RU and the dimension of the PUSCH symbols reduced to lesser than the total antennas;
b. in another alternative, the first combining matrix is computed by taking either the minimum eigen values or maximum eigen values or randomly selected eigen values and corresponding eigen vectors from the eigen decomposition of the noise covariance matrix, vectors from null space of channel matrix of some of desired users and/or intra-cell interferers and channel matrices of desired and intra-cell interferers transferring the weight to RU;
c. the DMRS is transferred over all or some subset of antennas to the DU;
d. DU applies the second part of the combining matrix on the PUSCH symbols from RU; and
e. a second weight computed based on the DMRS is applied in the DU.

A technical benefit of system 100 is that it addresses the channel aging problem. In this regard, system 100 uses LP/Kalman techniques to predict the channel estimate of a future PUSCH Uplink SF, based on channel estimates obtained using the current and past SRS symbols, and applying this as part of a combining matrix sent to an O-RU.

The techniques described herein are exemplary, and should not be construed as implying any particular limitation on the present disclosure. It should be understood that various alternatives, combinations and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

What is claimed is:

1. A method of decoding an uplink in a multiple input multiple output wireless communication system in an open radio access network having an open distributed unit (O-DU) and an open radio unit (O-RU), said method comprising:
said O-DU:
  constructing a combining matrix for a resource block, wherein said constructing comprises multiplying a received signal vector with a whitening vector, thus converting colored interference in said received signal vector into white interference, and wherein said whitening vector is based on channel estimates from past sounding reference signal symbols; and
  sending said combining matrix to said O-RU; and
said O-RU:
  utilizing said combining matrix to compress signals on $N_R$ antennas per subcarrier into M values, where $N_R$ is a number of antennas, and M is less than $N_R$; and
  sending said M values per subcarrier to said O-DU.

2. The method of claim 1,
wherein said constructing comprises reducing interference by multiplying a received signal vector with a nulling vector, and
wherein said nulling vector is based on channel estimates from past sounding reference signal symbols.

3. The method of claim 1, wherein said constructing comprises:
estimating channel values from past sounding reference signals, thus yielding estimated channels; and
using a conjugate of said estimated channels in said combining matrix.

4. The method of claim 1, wherein said method further comprises sending demodulation reference signals from said O-RU to said O-DU.

5. The method of claim 1, further comprising using said combining matrix to send said M values for demodulation reference signals from said O-RU to said O-DU.

6. The method of claim 1, further comprising:
learning linear prediction (LP) coefficients from sounding reference signals;
using said LP coefficients for said constructing said combining matrix; and
using said combining matrix to send said M values for demodulation reference signals from said O-RU to said O-DU.

7. The method of claim 1, wherein said constructing comprises:
learning linear prediction (LP) coefficients from sounding reference signals (SRS);
using said LP coefficients to predict a channel in a current subframe based on channel values from past SRS symbols, thus yielding a predicted channel for said current subframe;
computing a nulling vector from said predicted channel;
computing a conjugated channel vector from conjugated values of said predicted channel; and
constructing said combining matrix from said whitening vector, said nulling vector, and said conjugated channel vector.

8. The method of claim 1, wherein said constructing comprises:
learning linear prediction (LP) coefficients from sounding reference signals (SRS) and demodulation reference signals;
using said LP coefficients to predict a channel in a current subframe based on channel values from past SRS symbols, thus yielding a predicted channel for said current subframe;
computing a nulling vector from said predicted channel;
computing a conjugated channel vector from conjugated values of said predicted channel; and
constructing said combining matrix from said whitening vector, said nulling vector, and said conjugated channel vector.

9. The method of claim 1, wherein said constructing comprises:
learning linear prediction (LP) coefficients from sounding reference signals (SRS) and compressed demodulation reference signals;
using said LP coefficients to predict a channel in a current subframe based on channel values from past SRS symbols, thus yielding a predicted channel for said current subframe;
computing a nulling vector from said predicted channel;
computing a conjugated channel vector from conjugated values of said predicted channel; and
constructing said combining matrix from said whitening vector, said nulling vector, and said conjugated channel vector.

10. A system comprising:
an open distributed unit (O-DU); and
an open radio unit (O-RU),
wherein said O-DU performs operations of:
constructing a combining matrix for a resource block,
wherein said constructing comprises multiplying a received signal vector with a whitening vector, thus converting colored interference in said received signal vector into white interference, and
wherein said whitening vector is based on channel estimates from past sounding reference signal symbols; and
sending said combining matrix to said O-RU; and
wherein said O-RU performs operations of:
utilizing said combining matrix to compress signals on $N_R$ antennas per subcarrier into M values, where $N_R$ is a number of antennas, and M is less than $N_R$; and
sending said M values per subcarrier to said O-DU.

11. The system of claim 10,
wherein said constructing comprises reducing interference by multiplying a received signal vector with a nulling vector, and
wherein said nulling vector is based on channel estimates from past sounding reference signal symbols.

12. The system of claim 10, wherein said constructing comprises:
estimating channel values from past sounding reference signals, thus yielding estimated channels; and
using a conjugate of said estimated channels in said combining matrix.

13. The system of claim 10, wherein said O-RU performs a further operation of sending demodulation reference signals to said O-DU.

14. The system of claim 10, wherein said O-RU performs a further operation of using said combining matrix to send said M values for demodulation reference signals to said O-DU.

15. The system of claim 10,
wherein said constructing comprises:
learning linear prediction (LP) coefficients from sounding reference signals; and
using said LP coefficients for said constructing said combining matrix, and
wherein said O-DU performs a further operation of:
using said combining matrix to send said M values for demodulation reference signals to said O-DU.

16. The system of claim 10, wherein said constructing comprises:
learning linear prediction (LP) coefficients from sounding reference signals (SRS);
using said LP coefficients to predict a channel in a current subframe based on channel values from past SRS symbols, thus yielding a predicted channel for said current subframe;
computing a nulling vector from said predicted channel;
computing a conjugated channel vector from conjugated values of said predicted channel; and
constructing said combining matrix from said whitening vector, said nulling vector, and said conjugated channel vector.

17. The system of claim 10, wherein said constructing comprises:
- learning linear prediction (LP) coefficients from sounding reference signals (SRS) and demodulation reference signals;
- using said LP coefficients to predict a channel in a current subframe based on channel values from past SRS symbols, thus yielding a predicted channel for said current subframe;
- computing a nulling vector from said predicted channel;
- computing a conjugated channel vector from conjugated values of said predicted channel; and
- constructing said combining matrix from said whitening vector, said nulling vector, and said conjugated channel vector.

18. The system of claim 10, wherein said constructing comprises:
- learning linear prediction (LP) coefficients from sounding reference signals (SRS) and compressed demodulation reference signals;
- using said LP coefficients to predict a channel in a current subframe based on channel values from past SRS symbols, thus yielding a predicted channel for said current subframe;
- computing a nulling vector from said predicted channel;
- computing a conjugated channel vector from conjugated values of said predicted channel; and
- constructing said combining matrix from said whitening vector, said nulling vector, and said conjugated channel vector.

19. A system comprising:
- an open distributed unit (O-DU) having a first processor and a first memory that contains first instructions; and
- an open radio unit (O-RU) having a second processor and a second memory that contains second instructions that are readable by said second processor,
- wherein said first instructions are readable by said first processor to cause said first processor to perform operations of:
  - constructing a combining matrix for a resource block, wherein said constructing comprises multiplying a received signal vector with a whitening vector, thus converting colored interference in said received signal vector into white interference, and wherein said whitening vector is based on channel estimates from past sounding reference signal symbols; and
  - sending said combining matrix to said O-RU; and
- wherein said second instructions are readable by said second processor to cause said second processor to perform operations of:
  - utilizing said combining matrix to compress signals on $N_R$ antennas per subcarrier into M values, where $N_R$ is a number of antennas, and M is less than $N_R$; and
  - sending said M values per subcarrier to said O-DU.

* * * * *